US008171050B2

(12) United States Patent
O'Halloran et al.

(10) Patent No.: US 8,171,050 B2
(45) Date of Patent: May 1, 2012

(54) METHOD AND APPARATUS FOR ACCESS, INTEGRATION, AND ANALYSIS OF HETEROGENEOUS DATA SOURCES VIA THE MANIPULATION OF METADATA OBJECTS

(75) Inventors: Sharyn O'Halloran, New York, NY (US); David Epstein, New York, NY (US); Martin Betz, Palo Alto, CA (US)

(73) Assignee: DataVine Research Services

( * ) Notice: Subject to any disclaimer, the term of this patent is extended or adjusted under 35 U.S.C. 154(b) by 455 days.

(21) Appl. No.: 12/169,477

(22) Filed: Jul. 8, 2008

(65) Prior Publication Data

US 2008/0270456 A1 Oct. 30, 2008

Related U.S. Application Data

(62) Division of application No. 11/056,636, filed on Feb. 11, 2005, now abandoned, which is a division of application No. 10/217,492, filed on Aug. 12, 2002, now abandoned.

(60) Provisional application No. 60/311,495, filed on Aug. 10, 2001.

(51) Int. Cl.
*G06F 7/00* (2006.01)
*G06F 17/30* (2006.01)

(52) U.S. Cl. ........................................................ 707/779

(58) Field of Classification Search ................... 707/779
See application file for complete search history.

(56) References Cited

U.S. PATENT DOCUMENTS

| | | | |
|---|---|---|---|
| 5,088,052 A | | 2/1992 | Spielman et al. |
| 5,359,724 A | * | 10/1994 | Earle ..................................... 1/1 |
| 5,634,053 A | | 5/1997 | Noble et al. |
| 5,745,681 A | | 4/1998 | Levine et al. |
| 5,897,622 A | | 4/1999 | Blinn et al. |
| 5,956,709 A | | 9/1999 | Xue |
| 5,999,933 A | | 12/1999 | Mehta |
| 6,336,117 B1 | | 1/2002 | Massarani |
| 6,349,310 B1 | | 2/2002 | Klein et al. |

(Continued)

FOREIGN PATENT DOCUMENTS

WO WO 00/75849 12/2000

(Continued)

OTHER PUBLICATIONS

European Office Action dated Nov. 25, 2008 in connection with Application No. 02 765 980.4-2201, 5 Pages.

(Continued)

*Primary Examiner* — Greta Robinson
*Assistant Examiner* — Jeffrey Chang
(74) *Attorney, Agent, or Firm* — Fish & Richardson P.C.

(57) ABSTRACT

A computer-based method represents a subset of a dataset table of rows and columns. The method includes selecting a set of blocking variables corresponding to blocking columns of the dataset table. For each row in the dataset table, a tuple of values for the blocking columns uniquely identifies the row within the dataset table. The method also includes selecting a set of non-blocking variables that correspond to columns of the subset. The set of non-blocking variables does not intersect the set of blocking variables. The method also includes creating a block information structure that includes both the set of non-blocking variables and, for each blocking variable in the set of blocking variables, a set of values.

14 Claims, 27 Drawing Sheets

U.S. PATENT DOCUMENTS

| | | | |
|---|---|---|---|
| 6,363,387 B1 | 3/2002 | Ponnekanti et al. | |
| 6,466,918 B1 | 10/2002 | Spiegel et al. | |
| 6,523,028 B1 | 2/2003 | DiDomizio et al. | |
| 6,581,064 B1 | 6/2003 | Senjalia | |
| 6,625,499 B2 | 9/2003 | Abdalla | |
| 6,629,079 B1 | 9/2003 | Spiegel et al. | |
| 6,704,721 B1 | 3/2004 | Hellerstein | |
| 6,750,864 B1 * | 6/2004 | Anwar | 345/440 |
| 6,850,917 B1 | 2/2005 | Hom et al. | |
| 2001/0054012 A1 | 12/2001 | Nayyar | |
| 2002/0010654 A1 | 1/2002 | Yonezawa et al. | |
| 2002/0019778 A1 | 2/2002 | Isaacson et al. | |
| 2002/0069114 A1 | 6/2002 | Charette et al. | |
| 2002/0103809 A1 | 8/2002 | Starzl et al. | |
| 2002/0138370 A1 | 9/2002 | Dan et al. | |
| 2002/0156685 A1 | 10/2002 | Ehrlich et al. | |
| 2002/0156688 A1 | 10/2002 | Horn et al. | |
| 2002/0174034 A1 | 11/2002 | Au et al. | |
| 2003/0018536 A1 | 1/2003 | Eggebraaten et al. | |
| 2004/0039657 A1 | 2/2004 | Behrens et al. | |
| 2006/0036510 A1 | 2/2006 | Westphal et al. | |
| 2007/0100842 A1 | 5/2007 | Wykes et al. | |

FOREIGN PATENT DOCUMENTS

| | | |
|---|---|---|
| WO | WO 01/41002 | 6/2001 |

OTHER PUBLICATIONS

European Patent Office Supplementary European Search Report dated Oct. 10, 2006 in connection with Application No. 02765980. 4-2201, 4 pages.

Xuequn Wu et al., "A graphical interface for cooperative access to distributed and heterogeneous database systems," Database engineering and applications symposium, 1997, IDEAS '97 Proceedings, pp. 13-22, Montreal, Que., Canada, Aug. 25, 1997.

G. Jakobson et al., "CALIDA: A system for integrated retrieval from multiple heterogeneous databases," Proc. of the 3rd Int. Conf. Data Knowledge Bases, San Matheo, CA, Jun. 28, 1988.

* cited by examiner $$B=[\{V_1, V_2, \ldots, V_n\}, X_1, X_2, \ldots, X_m]$$

FIG. 5A
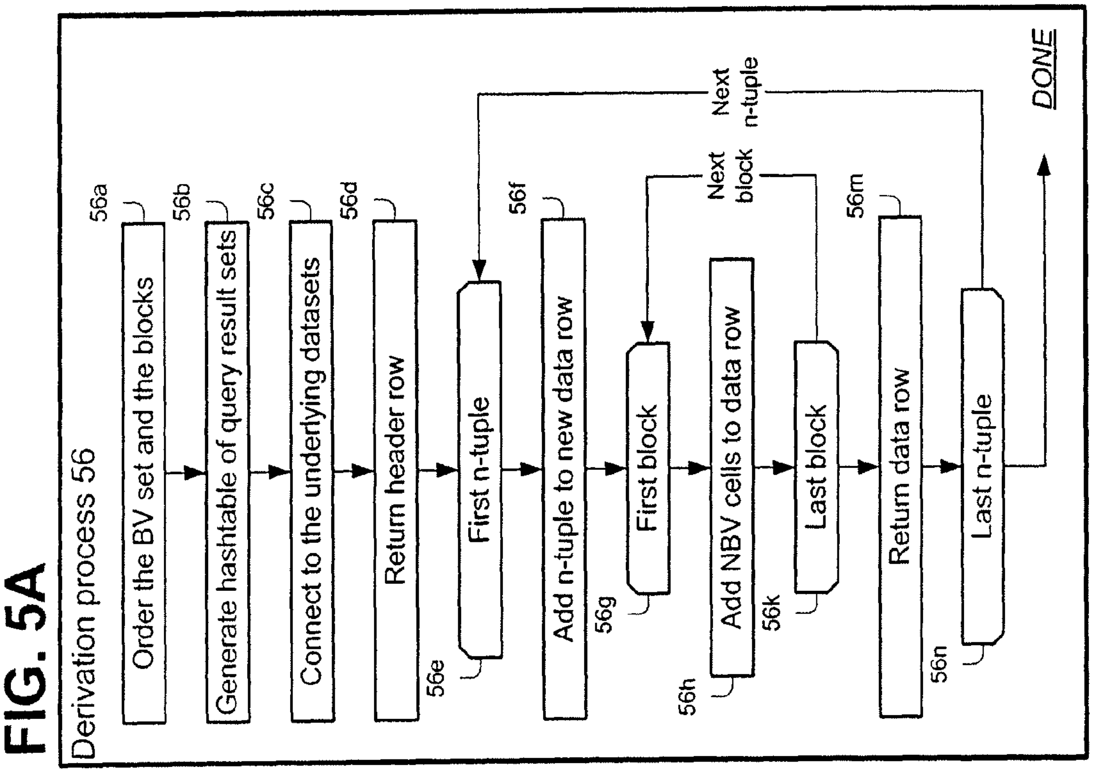
FIG. 5B
```
SELECT (V) FROM (D)
WHERE ((BV1=A OR BV1=B OR ...)
AND (BV2=X OR BV2=Y OR ...)
AND ...)
ORDER BY BV1, BV2, ....."
```
FIG. 5C
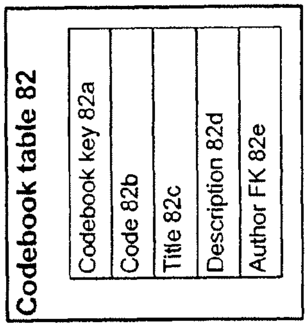

62

62

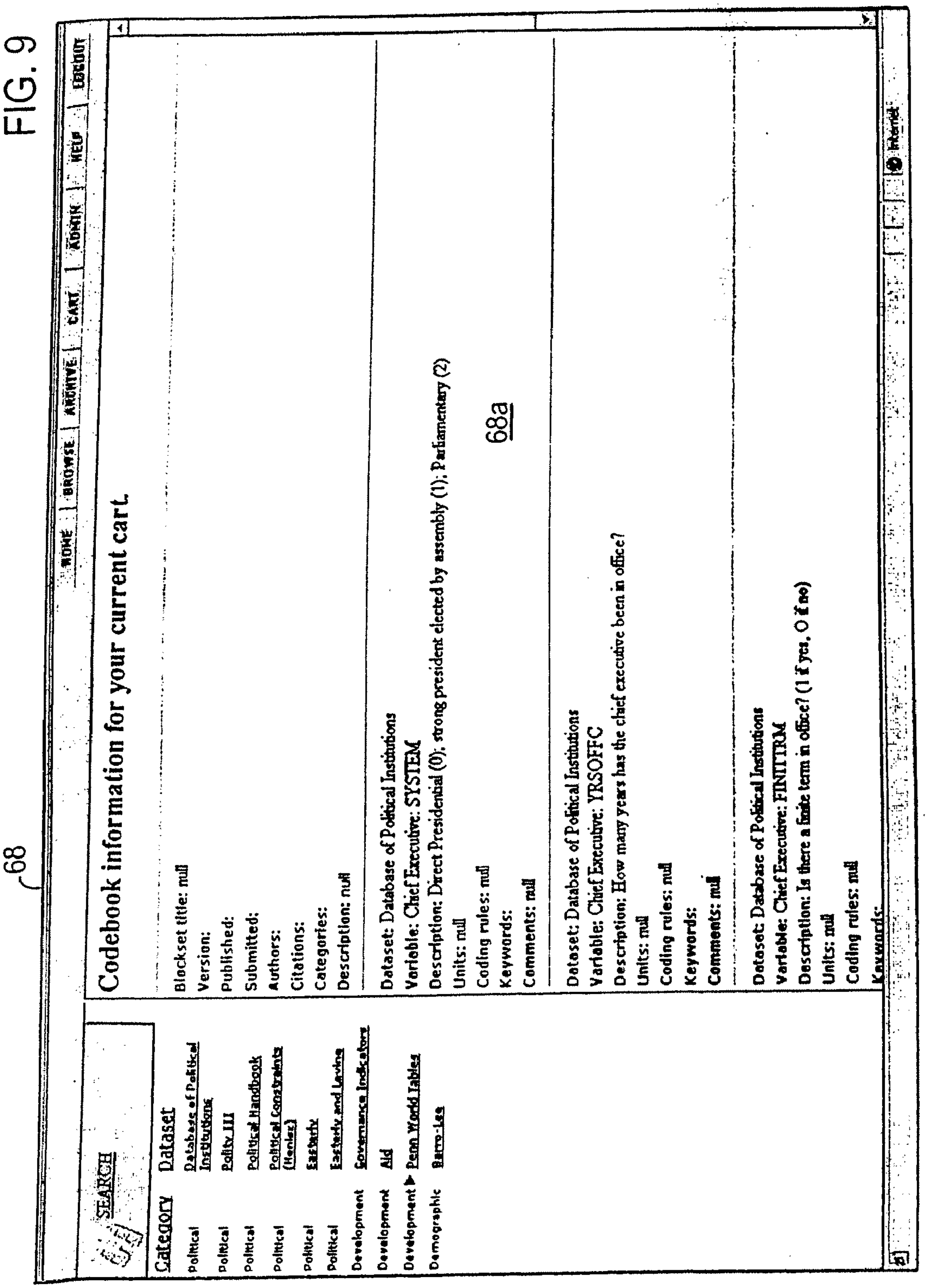

FIG. 9

Codebook information for your current cart.

SEARCH

| Category | Dataset |
|---|---|
| Political | Database of Political Institutions |
| Political | Polity III |
| Political | Political Handbook |
| Political | Political Constraints (Henisz) |
| Political | Easterly |
| Political | Easterly and Levine |
| Development | Governance Indicators |
| Development | Aid |
| Development ▶ | Penn World Tables |
| Demographic | Barro-Lee |

Blockset title: null
Version:
Published:
Submitted:
Authors:
Citations:
Categories:
Description: null Dataset: Database of Political Institutions
Variable: Chief Executive: SYSTEM
Description: Direct Presidential (0); strong president elected by assembly (1); Parliamentary (2)
Units: null
Coding rules: null
Keywords:
Comments: null _68a_

Dataset: Database of Political Institutions
Variable: Chief Executive: YRSOFFC
Description: How many years has the chief executive been in office?
Units: null
Coding rules: null
Keywords:
Comments: null Dataset: Database of Political Institutions
Variable: Chief Executive: FINITTRM
Description: Is there a finite term in office? (1 if yes, 0 if no)
Units: null
Coding rules: null
Keywords:

70

Administration

You may:
List all users.
Add datasets.
Specify authors and categories.
Reload cached data.
Show database status.

74b

HOME | BROWSE | ARCHIVE | CART | ADMIN | HELP | LOGOUT

Adding a new dataset, step 1

What database contains the data and the codebook?

Database name: [db16]  [Submit]

74a

Administration

You may:
List all users
Add datasets
Specify authors and categories
Reload cached data
Show database status 74n Adding a new dataset, step 2

The database has been found.

Please specify which table contains the codebook:

Codebook
GovernanceIndicators

74c

Please specify which table contains the data:

Codebook
GovernanceIndicators

74d next

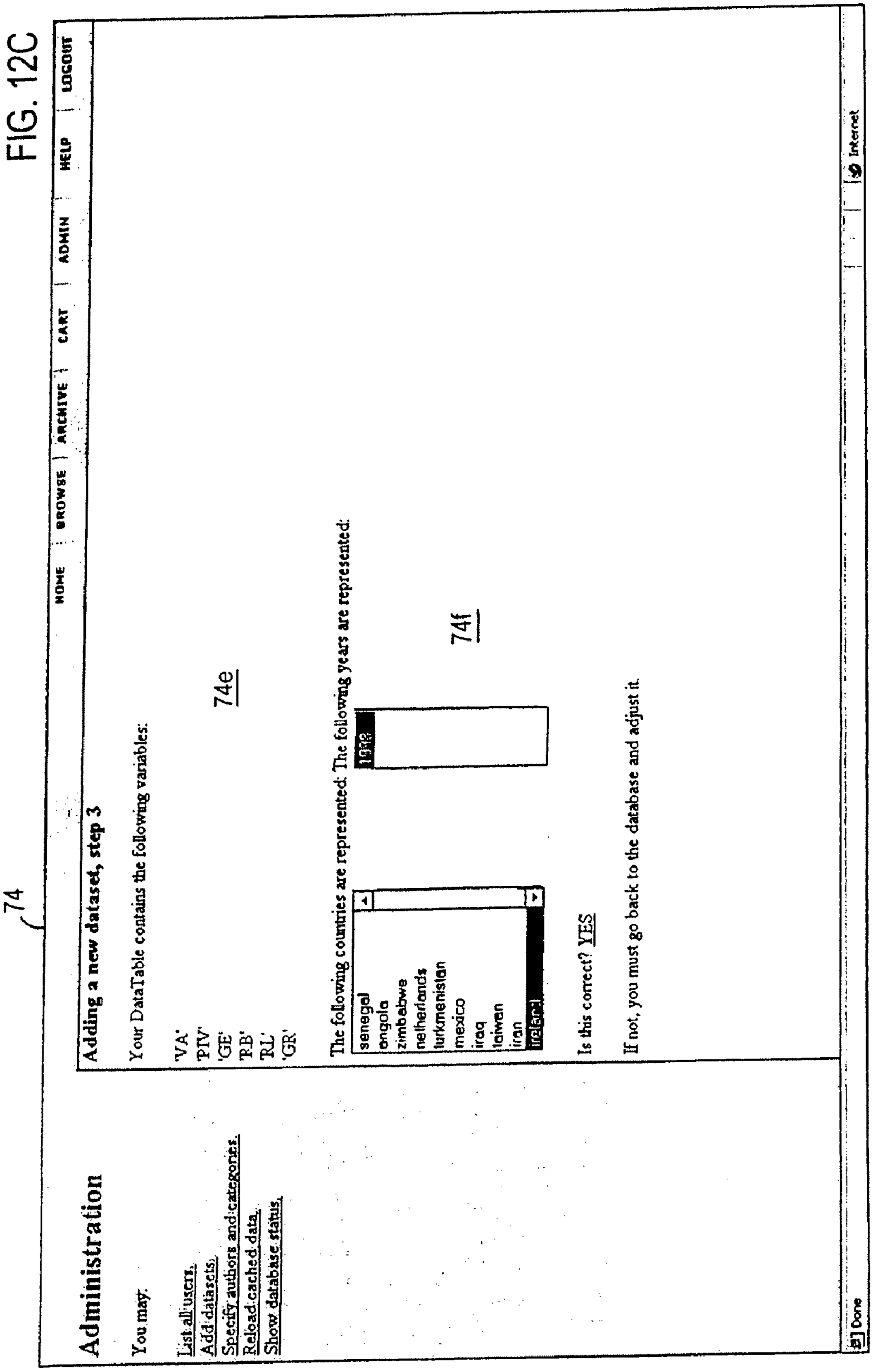

FIG. 12C

HOME | BROWSE | ARCHIVE | CART | ADMIN | HELP | LOGOUT

Administration

You may:

List all users.
Add datasets.
Specify authors and categories.
Reload cached data.
Show database status.

74

Adding a new dataset, step 3

Your DataTable contains the following variables:

'VA'
'PIV'
'GE'
'RB'
'RL'
'GR'

74e

The following countries are represented: The following years are represented:

senegal
angola
zimbabwe
netherlands
turkmenistan
mexico
iraq
taiwan
iran
ireland

1999

74f

Is this correct? YES

If not, you must go back to the database and adjust it.

Administration

You may:

List all users.
Add datasets.
Specify authors and categories.
Reload cached data.
Show database status.

What dataset?

Name: [Aid]

Select: [Authors] [Categories]

74g

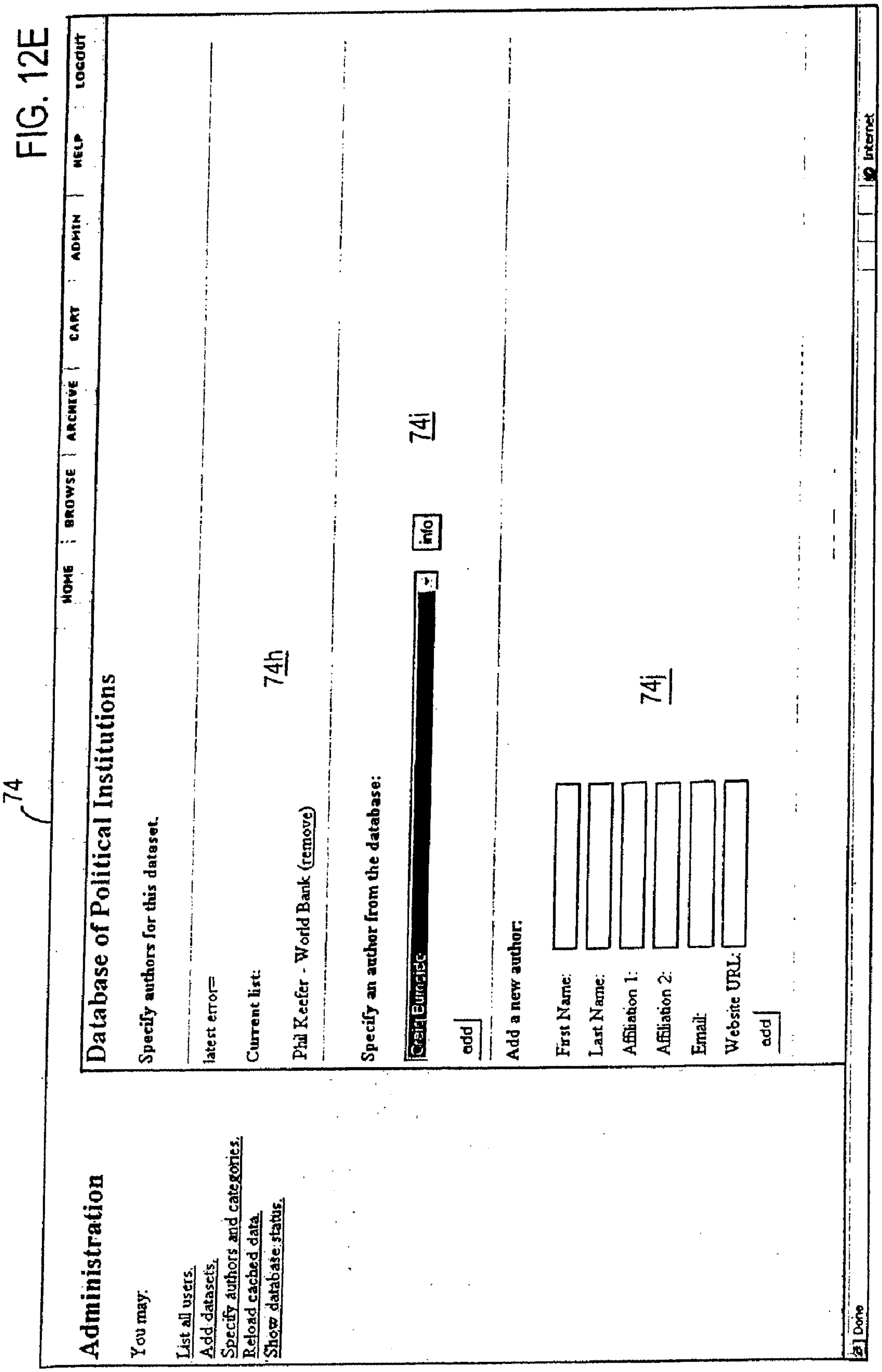

FIG. 12E

Administration

You may:

List all users.
Add datasets.
Specify authors and categories.
Reload cached data.
Show database status.

Database of Political Institutions

Specify authors for this dataset.

latest error=

Current list:

Phil Keefer - World Bank (remove)

Specify an author from the database:

Craig Burnside  [info]

add

Add a new author:

First Name:
Last Name:
Affiliation 1:
Affiliation 2:
Email:
Website URL:

add

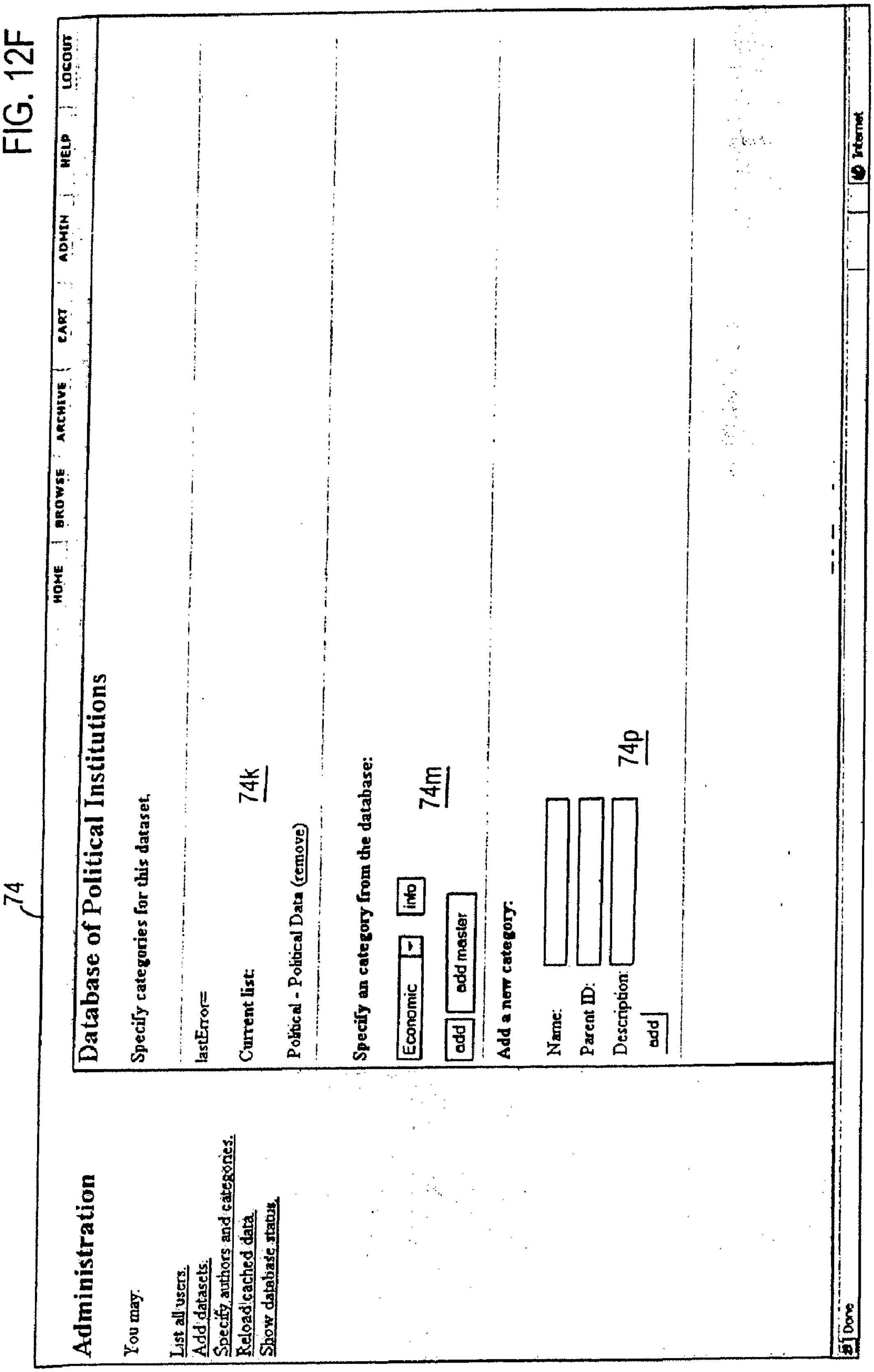

FIG. 12F

Database of Political Institutions  _74_

Specify categories for this dataset.

lastError=

Current list:  _74k_

Political - Political Data (remove)

Specify an category from the database:

[Economic ▼] [info]   _74m_
[add] [add master]

Add a new category:

Name: [       ]
Parent ID: [       ]   _74p_
Description: [       ]
[add]

Administration

You may:

List all users.
Add datasets.
Specify authors and categories.
Reload cached data.
Show database status.

METHOD AND APPARATUS FOR ACCESS, INTEGRATION, AND ANALYSIS OF HETEROGENEOUS DATA SOURCES VIA THE MANIPULATION OF METADATA OBJECTS

CLAIM OF PRIORITY

This application is a divisional of U.S. application Ser. No. 11/056,636, filed Feb. 11, 2005, which is a divisional of U.S. application Ser. No. 10/217,492, filed on Aug. 12, 2002, which is a non-provisional of U.S. Application 60/311,495, filed Aug. 10, 2001. The contents of all the foregoing applications are incorporated herein by reference.

TECHNICAL FIELD

This invention relates to computer information systems, and more particularly to the storage and manipulation of metadata for data sources.

BACKGROUND

In a complex technological environment, information is commonly stored in heterogeneous databases on a wide range of media. An organization's mission-critical information can be housed in a central server, updated on a continual basis via an online transaction processing (OLTP) system or an enterprise resource planning (ERP) system, using relational databases like Oracle, Sybase, or Microsoft Access. Other information can be housed remotely on servers and downloaded via specialized software. Still other information can be stored on Compact Discs and updated periodically with new releases.

One traditional approach to integrating disparate data sources is built around the notion of a "data cube," or dimensional database, which employs a star schema to organize the constituent data sets. This technology can place high demands on system resources when the entire data cube must be rebuilt after a single data set or data point changes. Also, since the entire data cube must be traversed when merging, subsetting, or analyzing data, this process can be slow, creating system bottlenecks.

SUMMARY

In general, in one aspect, the invention features a computer-based method of representing a subset of a dataset table of rows and columns. The method includes selecting a set of blocking variables corresponding to blocking columns of the dataset table. For each row in the dataset table, a tuple of values for the blocking columns uniquely identifies the row within the dataset table. The method also includes selecting a set of non-blocking variables that correspond to columns of the subset. The set of non-blocking variables does not intersect the set of blocking variables. The method also includes creating a block information structure that includes both the set of non-blocking variables and, for each blocking variable in the set of blocking variables, a set of values.

Preferred embodiments include the following. For each row in the subset that has a tuple of values for the blocking columns, the values of the tuple are included in the corresponding sets of blocking-variable values. The subset of the dataset table includes the entire dataset table. The number of elements in the set of non-blocking columns, plus the number of elements in the sets of values for the blocking columns, is linearly proportionate to an upper bound on the binary storage requirements of the block information structure, particularly when such sets are arbitrarily large. The block information structure is stored on a machine-readable medium.

Among other advantages, this aspect of the invention provides a method for combining, selecting, and delivering data from heterogeneous databases. The method allows for the creation and manipulation of metadata entities called blocksets. Blocksets contain summary information about sets of data, and can therefore be manipulated quickly, flexibly, and efficiently in place of the datasets themselves. Blocksets contain metadata about the datasets, allowing a user to choose combinations of the datasets for viewing without having to access the datasets directly.

In general, in another aspect, the invention features a computer-based method of accessing information in heterogeneous databases. The method includes presenting a graphical user interface, with controls representing a data cart and a plurality of datasets. The method also includes receiving user input that selects a dataset to add to the data cart. The method also includes generating a block information structure that specifies the dataset, and adding the block information structure to the data cart.

Preferred embodiments include the following. The method incorporates into the block information structure a set of non-blocking variables, a set of blocking variables, and for each such blocking variable, a set of values. The dataset includes a plurality of rows, each identified by a corresponding tuple of values from the sets of values for the blocking variables. For a blocking variable in the set of blocking variables, the method further includes presenting enumeration controls in the graphical user interface. Each enumeration control corresponds to an existing value in the dataset for the blocking variable. The method further includes collecting user input that specifies a subset of the dataset, and includes representing the subset in corresponding block information structure. The method further includes saving the data cart to a persistent storage medium. The method further includes adding a second block information structure to the data cart, in response to user input. The controls representing a data cart include a symbol of a shopping cart.

The graphical user interface allows a user to construct blocksets known as data carts. The method further includes collaboration features such as the ability to save and comment on blocksets, and the option of peer-to-peer systems that accommodate geographically dispersed data sources.

In general, in still another aspect, the invention features a computer-based method of retrieving information represented by a blockset. The method includes connecting to databases, wherein each database corresponds to a block in the blockset. Each such block specifies a subset of a dataset stored in the corresponding database. The blockset has a plurality of blocking variables. The blocks each include a set of non-blocking variables, and have a set of values for each blocking variable in the plurality of blocking variables. The method includes adding a blocking column to a derived table, once for each blocking variable in the set of blocking variables. The method also includes adding to the derived table a non-blocking column for each element in a union of the non-blocking variables in the plurality of blocks. Furthermore, the method includes adding a row to the derived table. The row includes a cell for each column in the derived table. The row is uniquely identified by a tuple of values from the sets of values for the blocking variables. The method also includes populating a cell of a non-blocking column in the row, using a value retrieved from the database corresponding to the block. The block contains the non-blocking variable corresponding to the non-blocking column.

Preferred embodiments include the following. The method further includes adding a row for each tuple of values from the sets of values for the blocking variables, provided the tuple occurs in at least one dataset corresponding to a block in the plurality of blocks. The method includes, when connecting, using each block as a basis for a database query that specifies the corresponding subset. The database query uses Structured Query Language.

In general, in yet another aspect, the invention features a computer-based method of representing a table derived from a blockset, including outputting blockset metadata that describes the blockset. The blockset metadata includes fields for a blockset title and a blockset description. The method also includes outputting column metadata for a column in the table, such that the column metadata describes a variable associated with the column. The variable is associated with an underlying dataset that provides data to the table in the blockset. The column metadata includes fields for a title of the variable and for a title of the underlying dataset.

In general, in another aspect still, the invention features a computer-based method of collecting metadata for a dataset, including prompting a user to provide a database name. The method also includes confirming that the database name represents a database, displaying a list of tables in the database to the user, receiving user input specifying a table in the list of tables, and prompting the user to confirm that a list of blocking variables and a list of non-blocking variables are correct for the database. In addition, the method includes prompting the user to confirm metadata for the dataset and for the list of non-blocking variables. If the user confirms the list of blocking variables, the list of non-blocking variables, and the metadata, the method also includes adding a dataset corresponding to the table to a collection of datasets.

Preferred embodiments include the following. The metadata includes a title for the dataset. The metadata includes a description for the dataset. The metadata includes a title for a non-blocking variable in the list of non-blocking variables. The metadata includes a description for a non-blocking variable in the list of non-blocking variables.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A is a flowchart of a derivation process.

FIG. 5B is a formula for a database query to retrieve a dataset table underlying a block.

FIG. 5C is a codebook table.

FIG. 9 is a snapshot of a user interface for a sample codebook.

FIGS. 12A through 12F are snapshots of a user interface for an administrator page.

DETAILED DESCRIPTION

Figure 1A:
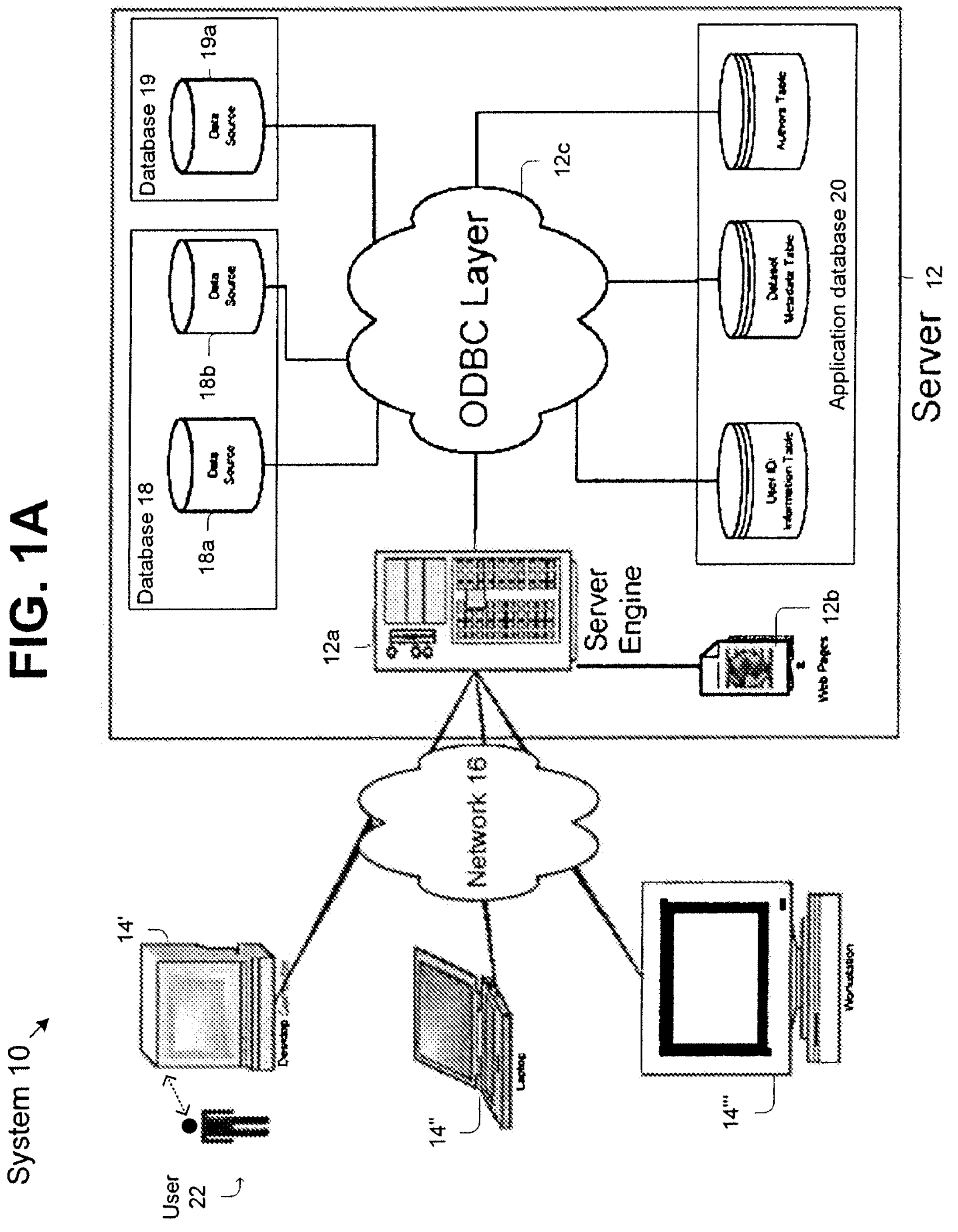
FIG. 1A is a schematic diagram of an information processing system.

Referring to FIG. 1A, physical elements of an information processing system 10 include a server 12 connected to client machines 14 such as workstations, laptops, or desktop computers via a network 16. For example, network 16 could include an Internet connection, an intranet within a single organization, or an extranet connecting an organization and its associates.

Server 12 includes software components such as a web server engine 12*a*, databases 18, and an application database 20. Web server engine 12*a* serves out web pages 12*b* over the network. Web server 12*a* connects to database tables 18*a* of databases 18 via a database connection protocol, such as ODBC (Open DataBase Connectivity) 12*c*. Web server 12*a* also connects to application database 20, which includes metadata tables and user information tables. Furthermore, web server engine 12*a* encodes procedures for creating and manipulating metadata objects called blocksets and related entities, as will be explained in more detail with regard to FIG. 1C.

A user 22 interacts with information processing system 10 via client machine 14.

Figure 1B:
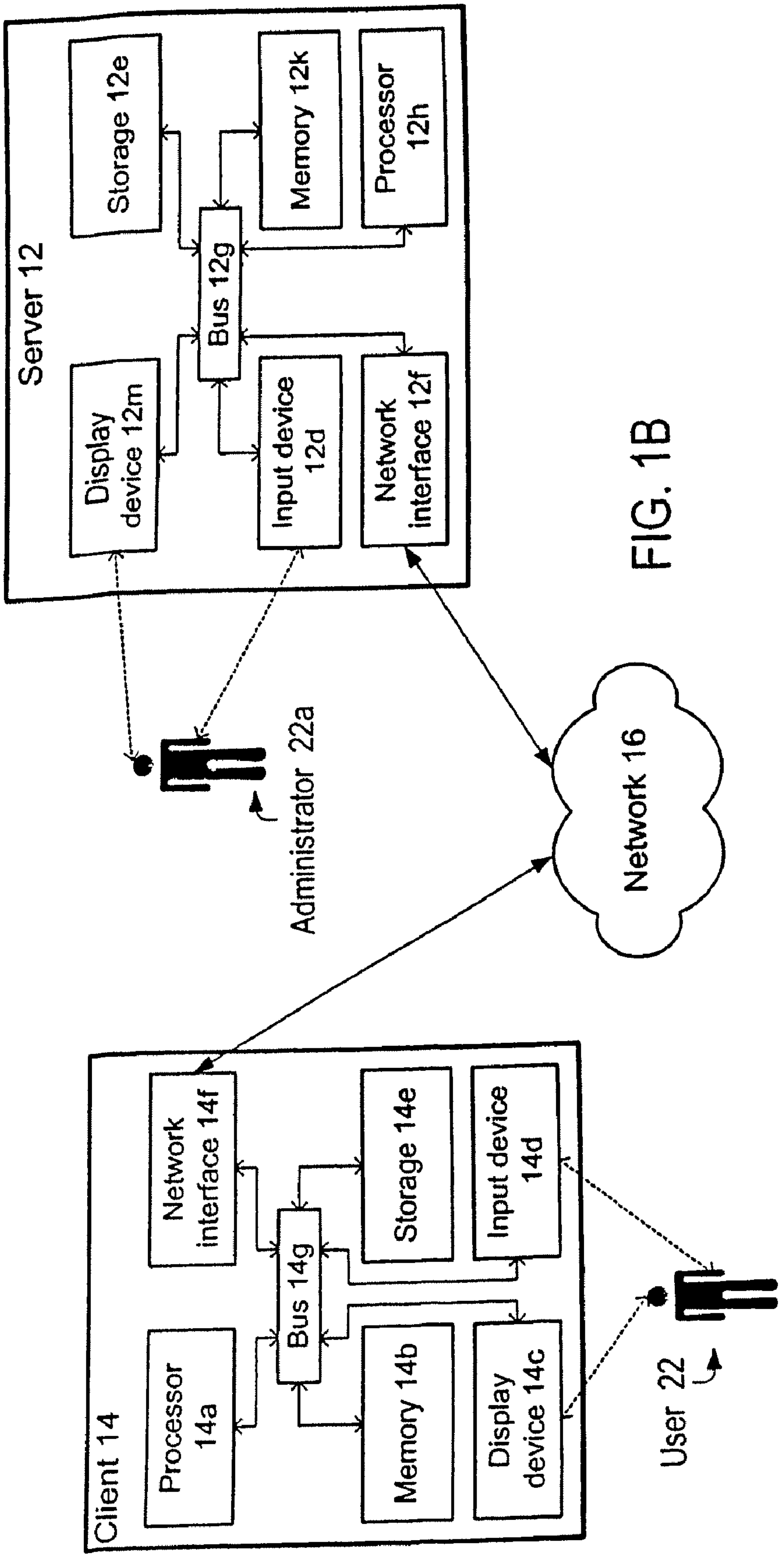
FIG. 1B is a schematic diagram of physical components of an information processing system.

Referring to FIG. 1B, client machine 14 includes a processor 14*a* that operates on data stored in memory 14*b* and executes machine-readable instructions stored in storage 14*e* and in memory 14*b*. Client machine 14 renders visual information on a display device 14*c* and receives input from a user 22 via one or more input devices 14*d*, such as a mouse and keyboard. Storage 14*e* includes an operating system that uses a point-and-click GUI. Client machine 14 also runs a web browser application, not shown, that logically connects to web server engine 12*a* (FIG. 1A). Network interface 14*f* connects standalone device 14 to network 16. Bus 14*g* carries information between components of standalone device 14.

Components of server 12 are comparable in general structure and function to their like-named counterparts in client machine 14. In particular, processor 12*h* executes machine-readable instructions that encode web server engine 12*a*, databases 18, and application database 20.

A human administrator 22*a* interacts with server 12. Administrator 22*a* typically has advanced privileges on server 12, while typical users 22 do not. In this discussion, however, unless specified otherwise, the term "user" refers to both users 22 and to administrators 22*a*. That is, administrators 22*a* are a subset of users 22.

Figure 2:
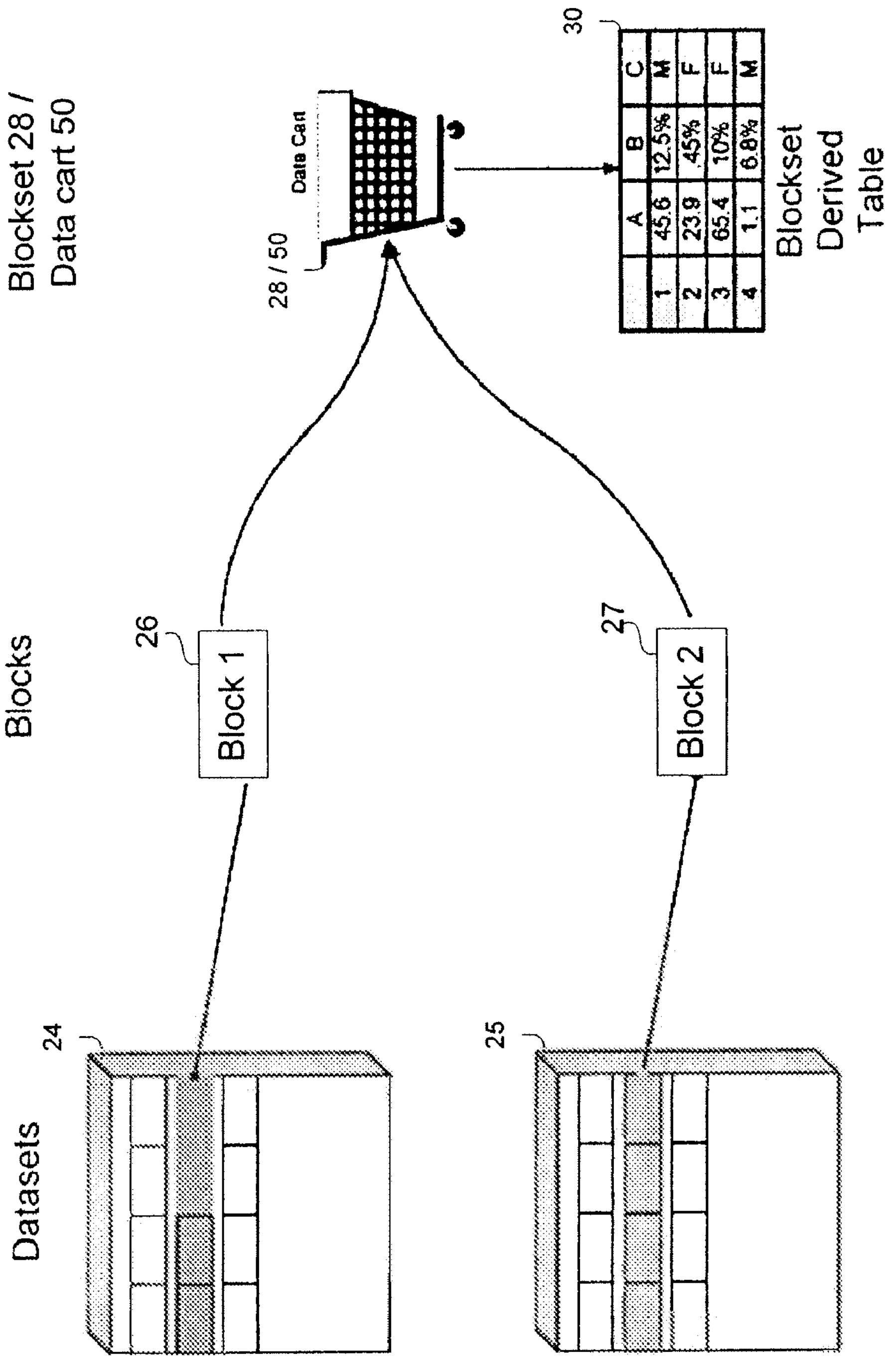
FIG. 2 is a diagram is a schematic diagram of relationships between datasets, blocks, blocksets, and blockset derived tables.

Referring to FIG. 2, logical entities used in system 10 include a dataset 24, a block 26, a blockset 28, and a blockset derived table 30. Broadly, and as will be explained in more detail, a dataset 24 represents a table of data. A block 26 summarizes a portion of a dataset (including perhaps the entire dataset); the summarized dataset is said to "underlie" the block. A blockset 28 collects one or more blocks. A blockset derived table 30 is a table of data for a blockset, collecting, for the blocks in the blockset, the corresponding portions of the underlying datasets.

Dataset

Figures 3A, 3B:
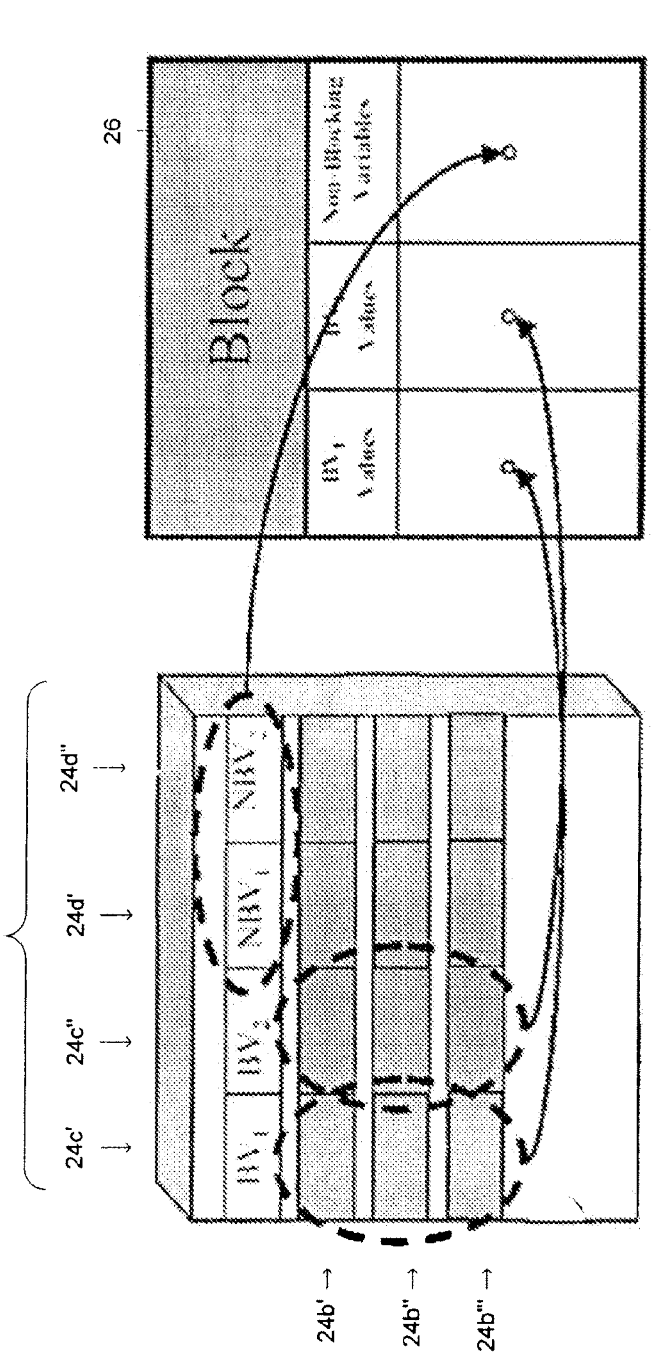
FIG. 3A is a diagram of block creation from datasets.
FIG. 3B is a formula expressing a block.

Referring to FIG. 3A, dataset 24 is an information structure that encodes a series of observations on a given set of variables. The observations are stored in data sources 18*a* (FIG. 1).

This description refers to elements of dataset 24 in the standard manner, with the data arranged in a table whose columns 24*a* represent variables and whose rows 24*b* represent observations. For a variable i that includes an M by 1 column vector Xi, where "M" is the number of rows, then an M by N dataset is a matrix of the form $[X_1\ X_2 \ldots X_n]$. This matrix contains blocking variables 24*c* which, collectively, uniquely identify a given observation. Other variables in the dataset are non-blocking variables 24*d*. For instance, a dataset on cars might uniquely identify each car by its make, model and year. Make, model and year would be encoded as blocking variables of the corresponding dataset. Non-blocking variables might include the car's size, price and gas mileage. As another example, a financial dataset might identify stocks by the ticker symbol and the day from which the closing price was taken. The non-blocking variables could include the stock price, volume traded, and any splits that might have occurred on that day. Each dataset contains at least one non-blocking variable.

TABLE 1

| WorldInfo dataset definition and metadata: |
|---|
| DsetID= 345; |
| DsetBlockingVars = Year, Country; |
| DsetNonblockingVars = Party, Tenure, ElexnMode; |
| DsetTitle = "Political Indicators"; |
| DsetDatabaseName = PolInd.mdb; |
| DsetTableName = "Indicators Data"; |
| DsetCodebookName = PolIndCodebook; |
| DsetDescription = "Various political indicators from IFC"; |
| DsetCategoryID = 3; |
| DsetCitation = "IFC Annual Report, 1998". |

In the example of Table 1, the necessary metadata elements are the database name, the blocking variable list, and the non-blocking variable list. The other metadata are optional, and may be used to describe the data set in the user interface, described with regard to FIGS. 6 through 12F, below. Other corresponding tables are used in conjunction with the dataset metadata, such as a Variables table with variable descriptions, a Categories table with textual descriptions of the category codes, or Authors and Citations tables with more extensive bibliographic information.

Data Group

A data group 34 is a collection of datasets 24 having identical blocking variables. Typically, datasets within a data group are logically connected to each other by referencing the same basic type of data. For instance, in the "WorldInfo" example of Table 1, all datasets have blocking variables for Country and Year. Thus they form a data group describing countries' economic, political, demographic, social, and geographic conditions on a year-to-year basis. Note that a single data set could logically belong to more than one group; for example, a data set containing daily stock prices could also belong to a group of yearly corporate data, simply by averaging daily information over each one-year period. Furthermore, one practiced in the art would recognize that various data groups can be combined together, for instance via the use of composite primary keys and intermediary translation tables.

Database Example

Figure 1C:
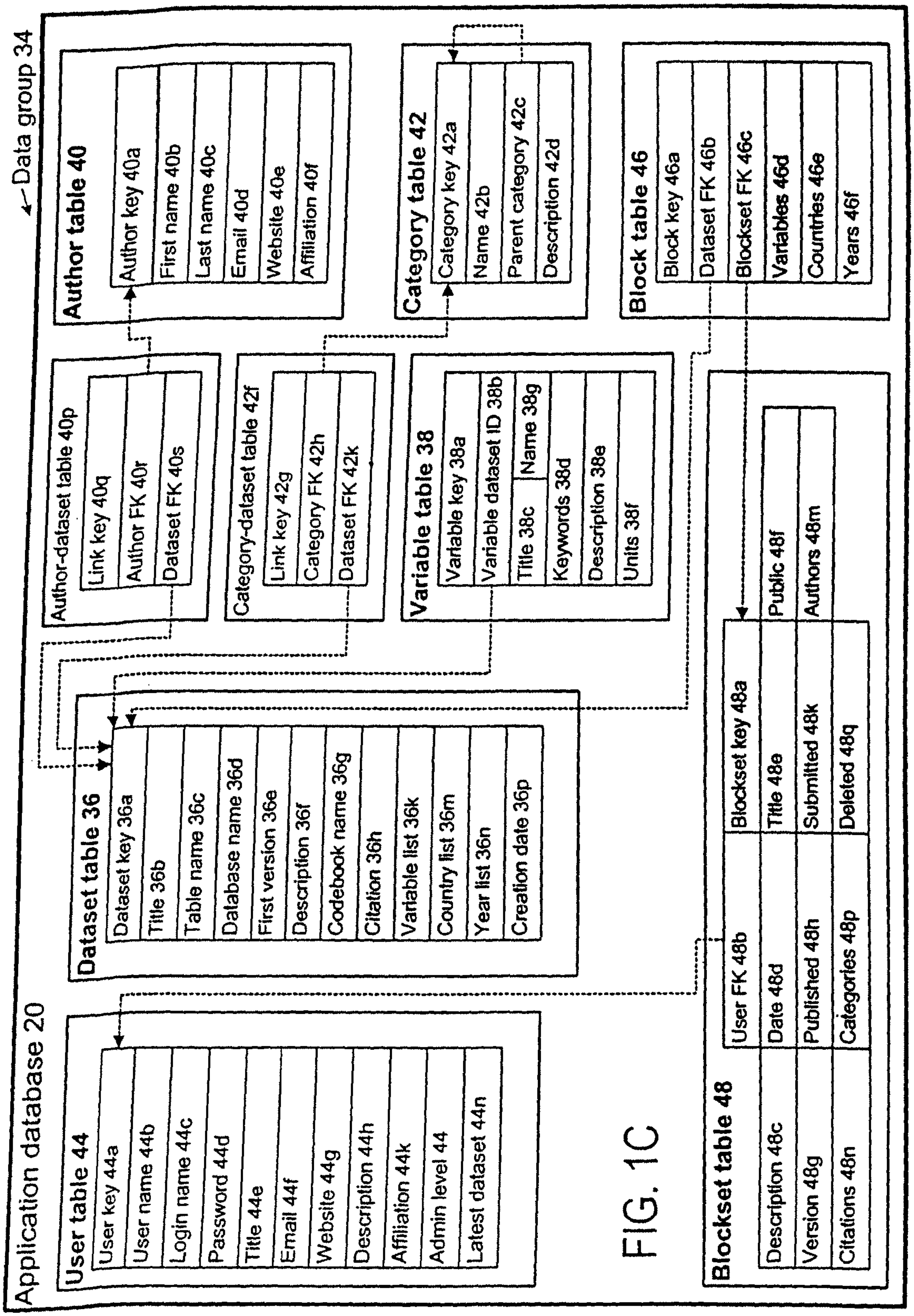
FIG. 1C is a diagram of a database schema for a data group example.

Referring now to FIG. 1C, an example application database 20 encodes a single data group 34 conforming to the "WorldInfo" example. That is, the blocking variables for each dataset are Country and Year.

Application database 20 includes a dataset table 36, a variable table 38, an author table 40, an author-dataset table 40*p*, a category table 42, a category-dataset table 42*f*, a user table 44, a block table 46, and a blockset table 48.

Dataset table 36 stores information for a dataset 24. Each row of dataset table 36 includes a dataset key 36*a*, which uniquely identifies rows within dataset table 36. Such a row also includes metadata fields for presentation to a user, such as a title 36*b*, which can be used as a caption in a user interface; description 36*f*, which can store phrases describing dataset 24 in detail; and codebook name 36*g*. Each row also includes metadata for locating the dataset 24 in a data source 18*a*, such as a table name 36*c* and a database name 36*d*. Fields for variable list 36*k*, country list 36*m*, and year list 36*n* store comma-delimited lists of values from the corresponding data source 18*a*. These lists cache data that specifies a block, reducing the need to connect directly to data source 18*a*. In particular, country list 36 stores the distinct values in the underlying data for the blocking variable Country in the WorldInfo example. Similarly, year list 36*n* stores distinct values for Year. Other bookkeeping data in dataset table 36 includes a first version 36*e* and a creation date 36*p*.

Variable table 38 stores information about non-blocking variables associated with a dataset 24. Each row of variable table 38 describes a variable. One row of dataset table 36 can be associated with many rows of variable table 38 via the foreign key field variable dataset ID 38*b*. Each row includes a title 38*c* for the variable, a units notation 38*f* of the values the variable measures, a list of keywords 36*d* associated with variable for searching, and a description 36*e*, which can store phrases describing the variable in detail. Name 38*g* indicates the corresponding column name for the variable in the underlying table. Rows also include variable key 38*a*, which uniquely identifies the rows within variable table 38.

Author table 40 and category table 42 provide supplementary metadata for a dataset 24, allowing many-to-many relationships between dataset table 36 and author table 40, and between dataset table 36 and category table 42. In general, a given author can be associated with one or more datasets, and vice versa. Likewise, categories can be used to describe one or more datasets, and a given dataset can belong to one or more categories.

Each row of author table 40 represents an author that can be associated with data in a dataset 24. Each such row includes fields for a first name 40*b*, a last name 40*c*, an email address 40*d*, a website address 40*e*, and an affiliation 40*f*. Rows also include an author key 38*a*, which uniquely identifies the rows within author table 40.

Author-dataset table 40*p* implements the many-to-many relationship between dataset table 36 and author table 40. Link key 40*q* uniquely identifies the rows within author-dataset table 40*p*. Author FK 40*r* is a foreign key referencing author key 40*a*. Dataset FK 40*s* is a foreign key referencing dataset key 36*a*.

Each row of category table 42 represents a category that can be associated with data in a dataset 24. Rows include a category key 42*a*, which uniquely identifies the rows within author table 40. Each such row includes fields for a category name 42_b_ and a description 42_d_, which can store phrases describing the category in detail. A field for parent category 42_c_ is a reflexive foreign key, i.e., one that references category key 42_a_ of its own table, allowing category table 42 to store nested hierarchies of categories.

Category-dataset table 42_f_ implements the many-to-many relationship between dataset table 36 and category table 42. Link key 42_g_ uniquely identifies rows within author-dataset table 42_f_. Category FK 42_h_ is a foreign key referencing category key 42_a_. Dataset FK 42_k_ is a foreign key referencing dataset key 36_a_.

Each row of user table 44 stores persistent information about a system account for a human user 22, including a user name 44_b_, a login name 44_c_, a password 44_d_, and admin level 44_m_, which specifies a level of system privileges granted to the user. Each row also stores metadata about the user, such as title 44_e_, an email address 44_f_, a website 44_g_, and a description 44_h_. A field for affiliation 44_k_ indicates an organization or domain for the user. Latest dataset 44_n_ indicates the dataset 24 last used by the user, allowing the user to return to this dataset in a subsequent session.

Each row of block table 46 represents a block 26 (FIG. 2). One row of dataset table 36 can be associated with many rows of block table 46 via the foreign key field dataset FK 46_b_. Conversely, one row of block table 46 references one row of dataset table 36. That is, each block 26 has one dataset 24, but one dataset 24 can have many blocks 26.

One row of blockset table 48 can be associated with many rows of block table 46 via the foreign key field blockset FK 46_c_. Each block 26 has one blockset 28, but one blockset 28 can have many blocks 26.

Each row of block table 46 in the described example has a list 46_d_ of non-blocking variables associated with the block 26. Each row also has a set of values for the blocking variables Country and Year in the fields countries 46_e_ and years 46_f_, respectively. Rows also include a block key 46_a_, which uniquely identifies the rows within block table 46.

Each row of blockset table 48 represents a blockset 28. Each row has metadata describing the blockset 28 for presentation to a user, including fields for title 48_e_, description 48_c_, authors 48_m_, citations 48_n_, and categories 48_p_. Each row also includes bookkeeping fields such as date 48_d_, version 48_g_, published 48_h_, submitted 48_k_, and deleted 48_q_. A foreign key field user FK 48_b_ references a row in user table 44, indicating the user 22 who owns the blockset 28. A field for public 48_f_ indicates whether the blockset 28 should be shared with other users. Rows also include a blockset key 48_a_, which uniquely identifies the rows within blockset table 48.

In the WorldInfo example, a country table, not shown, maps three-letter abbreviations to country names. For example, an entry in the table contains an abbreviation value of "ITA" and a country name value of "Italy".

Blocks

In general, blocks refer to sets of data via metadata information. A block summarizes a set of data by including blocking-variable values that specify the set of data, together with metadata about additional, non-blocking-variable columns to associate with the block.

Referring to FIG. 3A, a block 26 describes a subset of data from one dataset 24. The subset is defined by specifying a set of non-blocking variables 24_d_ from the dataset and a set of values from each of the blocking variables 24_c_. Thus a block B from a dataset having m blocking variables and n non-blocking variables is represented by a (m+1)-tuple, shown in FIG. 3B. The $V_i$ are non-blocking variables and the $X_i$ are legal subsets of values from the m blocking variables. For the example WorldInfo implementation, a corresponding block definition includes: [{Non-blocking vars}, Country set, Year set].

TABLE 2

| WorldInfo block definition: |
|---|
| VariableSet = {23, 45, 73, 215}.<br>CountrySet = {GER, USA, SWE, AUS, CAN, JAP};<br>YearSet = {1980, 1985, 1990, 1995, 2000}; |

Table 2 gives a sample block definition for the WorldInfo example. The specified values for the Country blocking variable are codes for Germany, USA, Sweden, Austria, Canada, and Japan. The specified values for the Year blocking variable are 1980, 1985, 1990, 1995, 2000. Non-blocking variable are referred to by their key values 38_a_ (FIG. 1C).

Referring again to FIG. 2, as an example of a process of constructing a block, block 26 can represent an entire dataset 24. In this case, dataset 24 contains blocking variables 24_c_ labeled BV1 and BV2 and non-blocking variables 24_d_ labeled NBV1 and NBV2. The block 26 will therefore include the values 26_a_ that BV1 and BV2 take on within the desired subset. For instance, a year set might consist of the set {1991, 1992, 1993, 1994, 1995, 1996}. The block 26 also includes the names or labels of the non-blocking variables NBV1 and NBV2, which are stored in a list in field 26_b_. Notice that the names themselves or pointers to name identification fields are sufficient; the actual data within these fields need not be stored in the block itself.

Blocks require relatively little storage memory to reference large collections of data. For instance, a block containing i variables for j countries and k years can reference as many as i*j*k rows from the corresponding dataset, but the block can describe these rows using only i+j+k elements—a significant improvement for large values of i, j, or k. In general, the number of elements in the set of non-blocking variables and in the sets of values for the blocking columns provides an approximate upper bound on binary storage requirements of the block, subject to a linear scaling factor. As the sets grow arbitrarily large, the binary storage requirements of the block are on the order of the sum of the sizes of these sets. In other words, the binary storage requirements are linearly proportionate to the cardinality of these sets.

Blocksets

Figure 4:
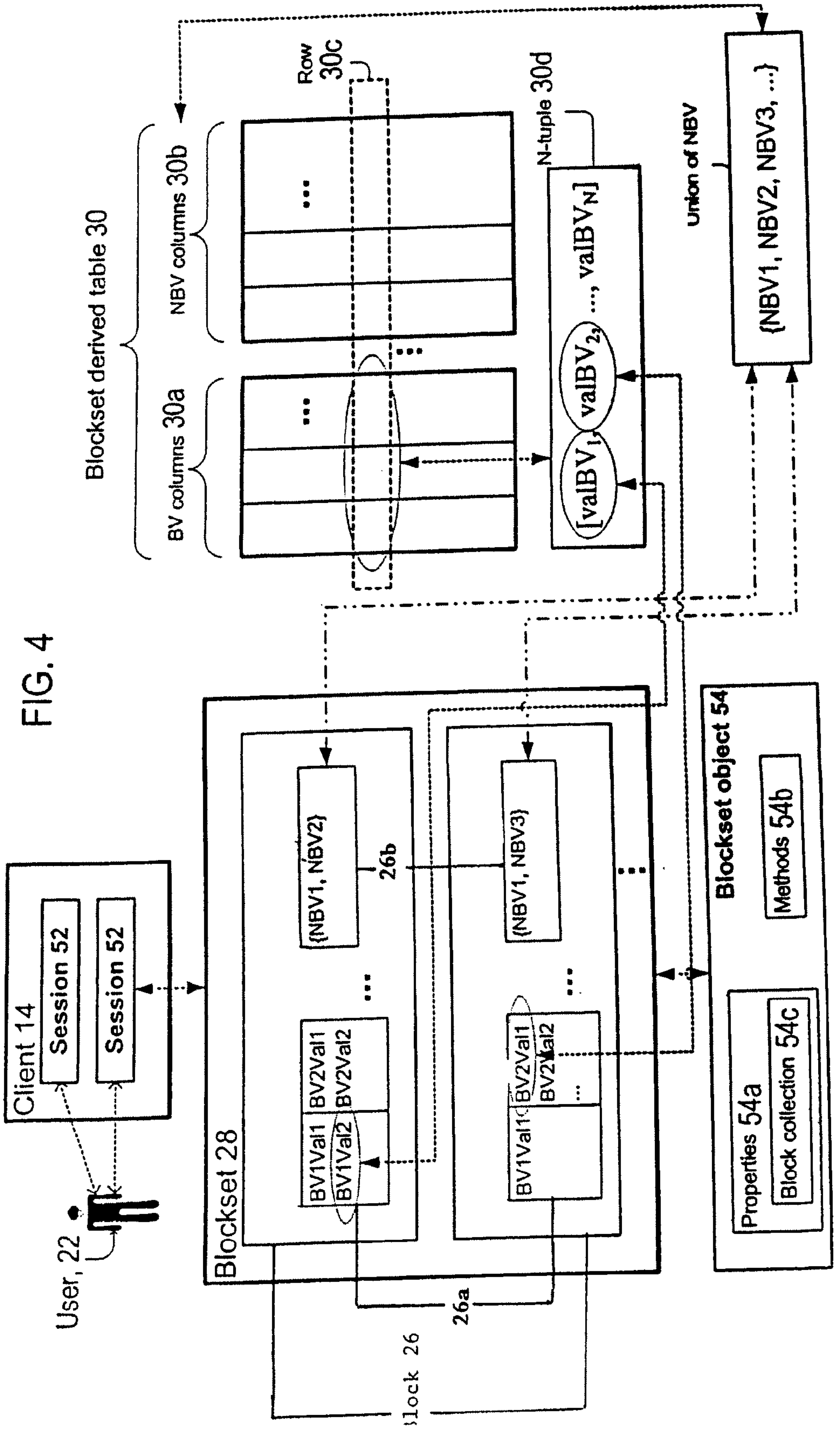
FIG. 4 is a schematic diagram of relationships between blocks, blocksets, and blockset derived tables, including n-tuples.

Referring to FIGS. 2 and 4, a blockset 28 is an unordered set of one or more blocks 26 from a single data group. For every block, there is a corresponding simple blockset with only one block. A user 22 interacts with system 10 in the context of one or more sessions 52 on client machine 14. Operations in one session 52 are independent of other sessions 52. A data cart 50 is a blockset 28 corresponding to the set of blocks currently selected in a session. Each session has either zero or one data cart 50. When initialized, a data cart is empty.

TABLE 3

| WorldInfo blockset definition and metadata: |
|---|
| MyBlocks = {43, 44, 45};<br>CreatorId = "joseph42";<br>Title = "Political Economy Dataset";<br>Description = "War, GDP, and famine data for Africa";<br>Version = "1.3";<br>Submitted = "Aug. 4, 2001";<br>Authors = "Joseph Kalt"; |

TABLE 3-continued

| WorldInfo blockset definition and metadata: |
| --- |
| Categories = "Politics, Economics, Development";<br>IsPublic = true. |

Of the fields in the example of Table 3, only the first (MyBlocks, expressing the collection of blocks) is strictly necessary to define the blockset; all others are examples of blockset metadata that is useful in storage and user display functions. In particular, keeping track of the blockset creator in the creatorId field allows blocksets to be saved and shared with other users.

Since blocksets include collections of blocks, in general, they place minimal demands on memory. Furthermore, in system 10, a blockset 28 is encoded in software as a blockset object 54. Thus, blockset objects contain both properties 54*a* and methods 54*b*; that is, data and operations. Properties 54*a* include the set 54*c* of blocks associated with the blockset 28, such as the vector myBlocks in the example of Table 3. Blockset objects 54 can also possess methods 54*b* which contain instructions on how to perform certain operations on blockset objects 54. For instance, a blockset object 54 can display summary information about itself by counting the number of variable entries in each of its constituent blocks. It can also associate a new block to itself by adding a reference to that block to its collection 54*c*. A blockset object 54 can merge itself with another blockset object 54 via a set union operation.

Blockset Derived Tables

System 10 can download blockset data to a client machine via a number of standard output formats.

Referring to FIG. 4, a derived table 30 relates to a blockset 28 in the following way. Table 30 has blocking variable columns 30*a*, one for each blocking variable in the data group. The other columns form a set 30*b*, which is the union of the non-blocking variables from the constituent blocks 26 of blockset 28. When distinct blocks are from the same dataset, they may include overlapping variables. In this case, the derived table contains only one column for each overlapping variable.

Table 30 has rows 30*c* for each of the blocking variable values specified in some block from the blockset. Specifically, if there are N blocking variables, the new table will have a row for every N-tuple 30*d* of blocking variable values, [$valBV_1$, $valBV_2$, . . . , $val_N$], where $val_X$ is one of the values specified for variable X in one of the blockset's blocks.

Table 30 has two types of columns: blocking variable columns 30*a*, and data columns 30*b*. Blocking variable columns have cells which contain the appropriate blocking variable values. That is, for a row associated to [$val_1$, $val_2$, . . . , $val_N$], the value for blocking variable i will be $val_i$. The data columns have cells that can be referenced by a row identifier, [$val_1$, $val_2$, . . . , $val_N$], and a non-blocking variable from one of the blocks in the defining blockset, e.g. NBvar from block K.

Consider the cell of the new table characterized by [$val_1$, $val_2$, . . . , $val_N$] and NBvar. If there is a block such that:

1. [$val_1$, $val_2$, . . . , $val_N$] is an allowed blocking variable combination, and 2. NBvar is an included variable, then this cell is filled in with the value from that block's dataset. Note that this value is the same if there are 2 such blocks in the blockset. If, for all such blocks, that cell does not exist, then this cell is empty in the new table. If {[$val_1$, $val_2$, . . . , $val_N$], Nbvar} is not an allowed combination for any block included in the dataset, then the cell is empty in the new table. Hence this algorithm produces an outer join of the multiple dataset tables referenced in the blockset's constituent blocks.

Derivation Process

Referring to FIGS. 5A and 5B, a derivation process 56 generates a blockset derived table 30 from a given blockset 28. This discussion assumes the dataset tables are stored in an SQL database, or some other container such that the data can be accessed via an SQL-like query language.

Derivation process 56 sequentially returns column values and table rows of a blockset derived table 30. Each returned row is represented as a list of values. The first row is header row, listing column names.

Initially, derivation process 56 defines an order for the blocking variable set 30*a* (step 56*a*), either arbitrarily or by user response. Derivation process 56 also defines an order for the blocks in the blockset.

Derivation process 56 generates a hashtable of query result sets (step 56*b*). Most standard query engines allow a client to define a result set and retrieve the data row by row. This allows the client to make only one query per block, and then use the natural ordering of the returned data to progressively fill in the newly generated table. The result sets are indexed by a block id, where the id reflects the block ordering defined above. Derivation process 56 therefore generates a hashtable which maps integers to data result sets from which data can be incrementally retrieved.

Derivation process 56 then connects to each of the data sources 18*a* (FIG. 1A) that provide the underlying datasets for the blocks in the blockset (step 56*c*). Derivation process 56 returns the first row (step 56*d*), generating the row incrementally, starting with the blocking variable names in their specified order. Derivation process 56 completes the row by going through the ordered blocks, appending each block's variable list.

Derivation process 56 traverses the result sets (loop bounded by 56*e* and 56*n*) in the same order as the rows that will be returned to the user. This way, no further requests need be made to the query engine. This ordering is created in the following way. For each dataset from which a block has been defined, generate a variable list V (FIG. 5B) which includes both blocking and non-blocking variables. Also generate the corresponding database table name D. Label the blocking variables BV1, BV2, . . . , and denote the union of values that BV1 takes on in all blocks with the set {A, B, C, . . . }, denote the union of values that BV2 takes on in all blocks with the set {X, Y, Z, . . . }, and so forth. Then for each block, derivation process 56 submits a query of the type shown in FIG. 5B, during connection to the underlying datasets (step 56*c*).

Alternatively, if the number of allowed values for a blocking variable is so large that the resulting query is unmanageable, the above query can be run without imposing any restriction on the value of blocking variables. The resulting query would then return data for blocking variable values which derivation process 56 would simply ignore. One benefit of this strategy is that, at this point in the process, several queries have been issued to query engines, and several connections are open. These connections are subsequently left open simultaneously, and data is retrieved incrementally, as needed. This enables the query process to run quickly and efficiently, more so than, for instance, standard queries against data cubes.

Derivation process 56 returns data for the blockset derived table 30 one row at a time, creating one row for each distinct n-tuple (step 56*f*). Derivation process 56 proceeds from one n-tuple to the next in the same order that the SQL engine uses when it returns data via "ORDER BY BV1, BV2, . . . " In particular, derivation process 56 progresses through the blocking variable values alphabetically, as if the n-tuple was concatenated into one long string. For example, this can be done by first looping through the values of the nth-blocking variable, returning it to its starting point, incrementing the n−1st variable value, and so on. In this way, every row of the resulting new data table is returned.

For each combination of allowed blocking variable values, i.e., for each n-tuple, derivation process 56 goes through the blocks in the block set (loop bounded by 56*g* and 56*k*). For each block, derivation process 56 retrieves a row of data from the corresponding result set, comparing the blocking variable values of that row to the current n-tuple. If it is a match, derivation process 56 adds the retrieved non-blocking variable values to the data row being created for table 30 (step 56*h*).

After all the blocks have been checked for a given n-tuple, derivation process 56 returns the data row (step 56*m*). Often, some of the data values will be empty. These may be represented by a "." in the returned list. The resulting dataset can be further modified via standard techniques to be read into various programs; e.g., XML output, spreadsheet programs such as Excel or Quattro Pro, database programs such as Oracle, Access, and SQL Server, statistical programs such as Stata, SPSS, and SAS, and so on.

User Interface

Figure 6:
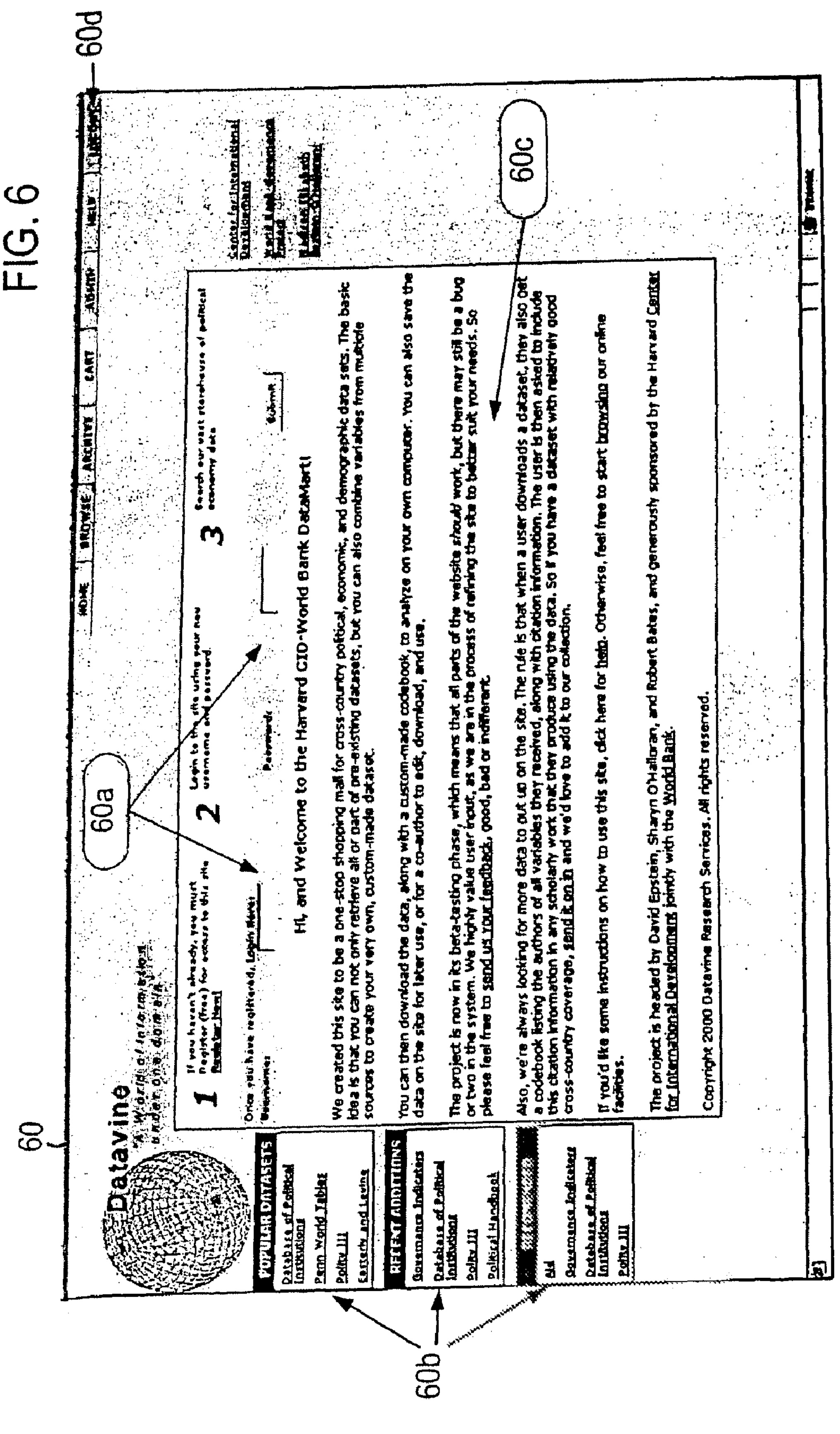
FIG. 6 is a snapshot of a user interface for a login page.

Referring to FIG. 6, a login web page 60 contains a login section 60*a*, a set of links 60*b* to selected datasets, a set of instructions 60*c* on how to use the page, and a set of quick links 60*d* to other sections of the site. In this embodiment, the system assigns a unique client identifier 44*a* (FIG. 1C) to each user 22, which is then used to access preferences and previous saved data sets for that user. In general, the user need only be able to enter the system by supplying his or her login information, and be given access to the datasets and previously stored data carts.

Browsing Area

Referring to FIGS. 7A-7E, a main browsing section 62 contains a link bar 62*a*, which may be identical to 60*d* or contain different options. Section 62 also contains a frame for a list of all available datasets 62*b* and a browsing area 62*c*. The datasets listed in 62*b* may be identical for all users, or they can vary depending on the user's identification and level of access privileges, stored for example in admin level 44*m* (FIG. 1C). The datasets area 62*b* also displays a Search option, which implements a search routine on all dataset titles, variable names, and descriptive metadata. If the system 10 hosts only one type of data, such as data grouped by country and year, then this browse page can be accessed directly.

If the system 10 has more than one type of data, then an intermediate selection stage allows the user to choose which type of data she wants to view, according to the data's blocking variables. These data groups could include, for instance, country-year, firm-year, firm-quarter, congressional district, stock-day, and so on. Once a type of data is selected, the system examines the metadata for the data sets currently available and selects those data sets of the currently selected data group. The browsing page for that data group is then dynamically generated and displayed to the user, and only those data sets in the system of the selected group are shown in area 62*b* of the resulting page.

Figure 7A:
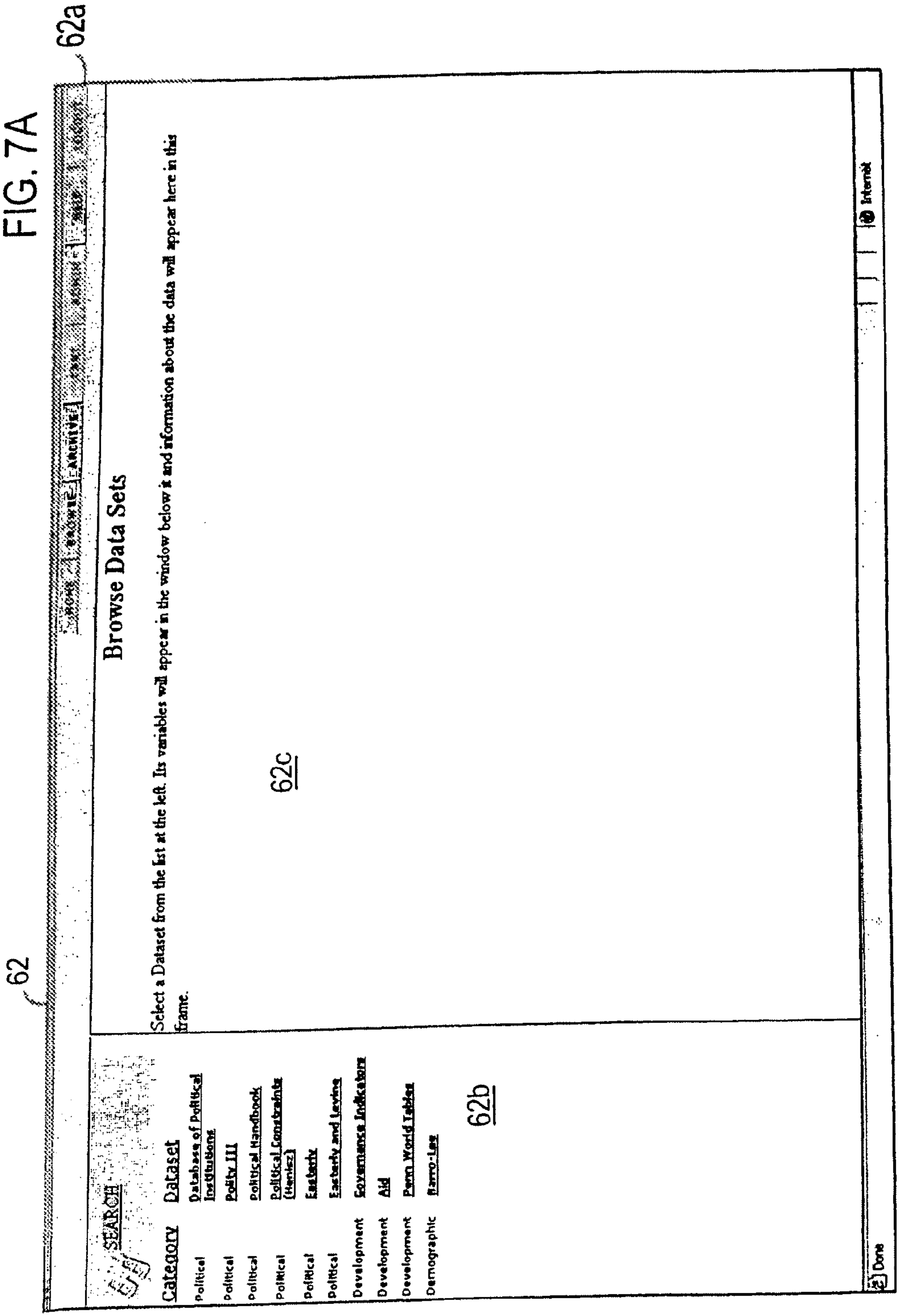
FIGS. 7A through 7E are snapshots of a user interface for a browsing environment.
Figure 7B:
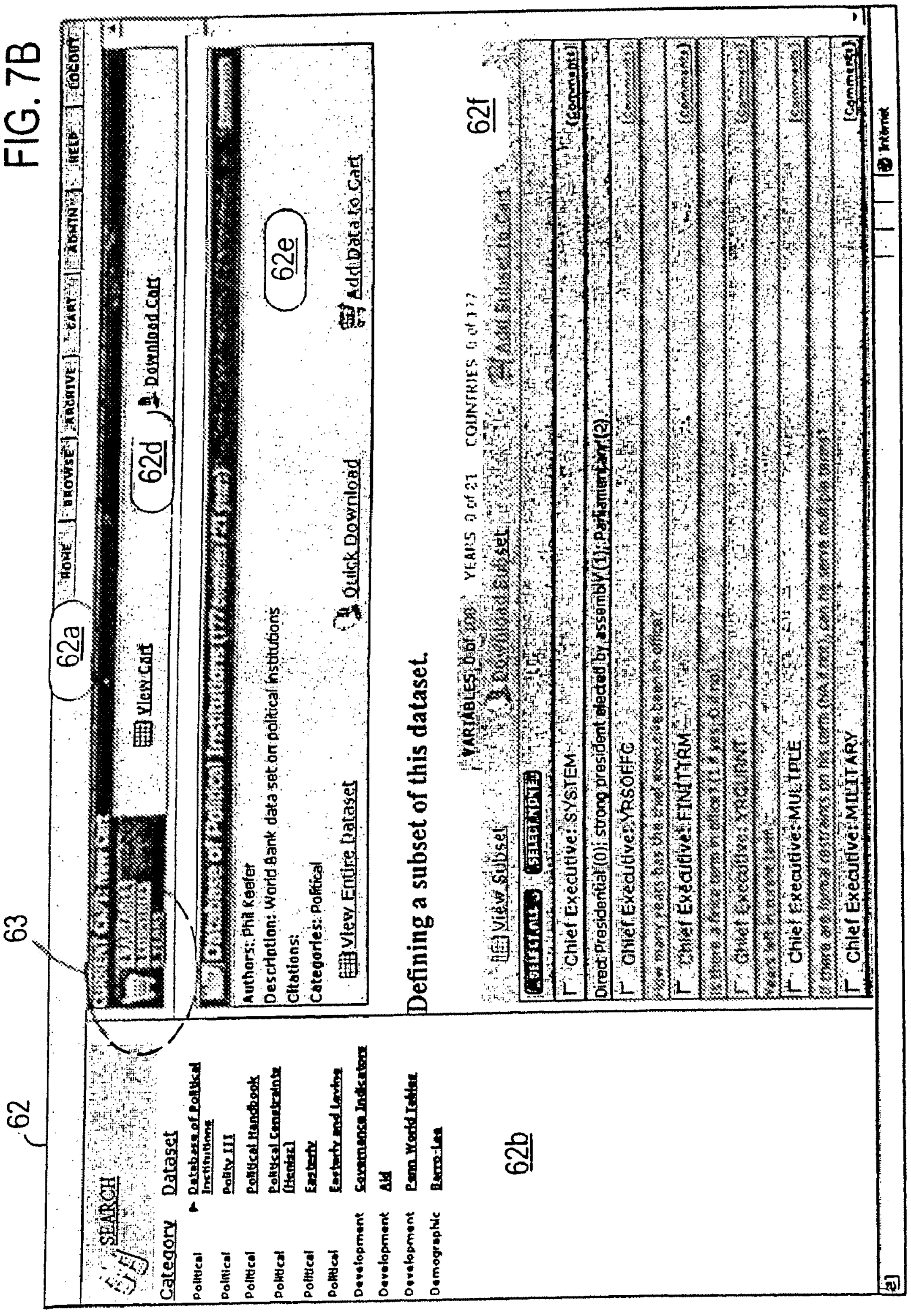

FIG. 7B shows the main browsing section 62 with the browsing area 62*c* replaced by the data cart summary 62*d*, the dataset summary 62*e*, and the data selection area 62*f*. This screen results when the user clicks on one of the datasets listed in 62*b*. The data shown in the data cart summary 62*d* summarizes the current blockset. Data cart summary 62*d* includes an icon 63 that has an image of a physical shopping cart. The dataset summary 62*e* is constructed from dataset metadata stored in application database 20. The cart summary contains descriptive information on the current data cart, described more fully below. The dataset summary contains summary information on a given dataset and a Quick Download option, in which the entire dataset is downloaded as a single blockset, using derivation process 56 (FIG. 5A). The Add Data to Cart option adds the blockset consisting of the entire dataset to the current cart.

The data selection area contains a number of tabs: one for each blocking variable and one for all other non-blocking variables. In the present example, the blocking variables are country and year, while the non-blocking variables are SYSTEM, YRSOFFICE, FINITTRM, etc. The system allows the user to choose one or more variables; in the example, this is done through checkboxes. It also allows for the immediate download of a subset via the Download Subset link, which downloads the currently selected blockset as defined by the choices made on the tabs. Various default options are available if the Download Subset link is pressed before all the tabs have been filled out; unused tabs may be assumed to be empty, for instance, or have all possible choices filled. Similarly, the Add Subset to Cart option adds the subset defined by the tabs to the current cart. Not all the variables in a dataset need be available to all users; dataset access, variable access, and data point access can all be limited via security clearance codes and data filtering. Each variable can also have one or more comments associated with it, stored in description 44*h* (FIG. 1C). The user can access controls to create comments by clicking on the comment link next to any variable. These comments can be emailed to the system administrator and other users via standard mailing programs.

Figure 7C:
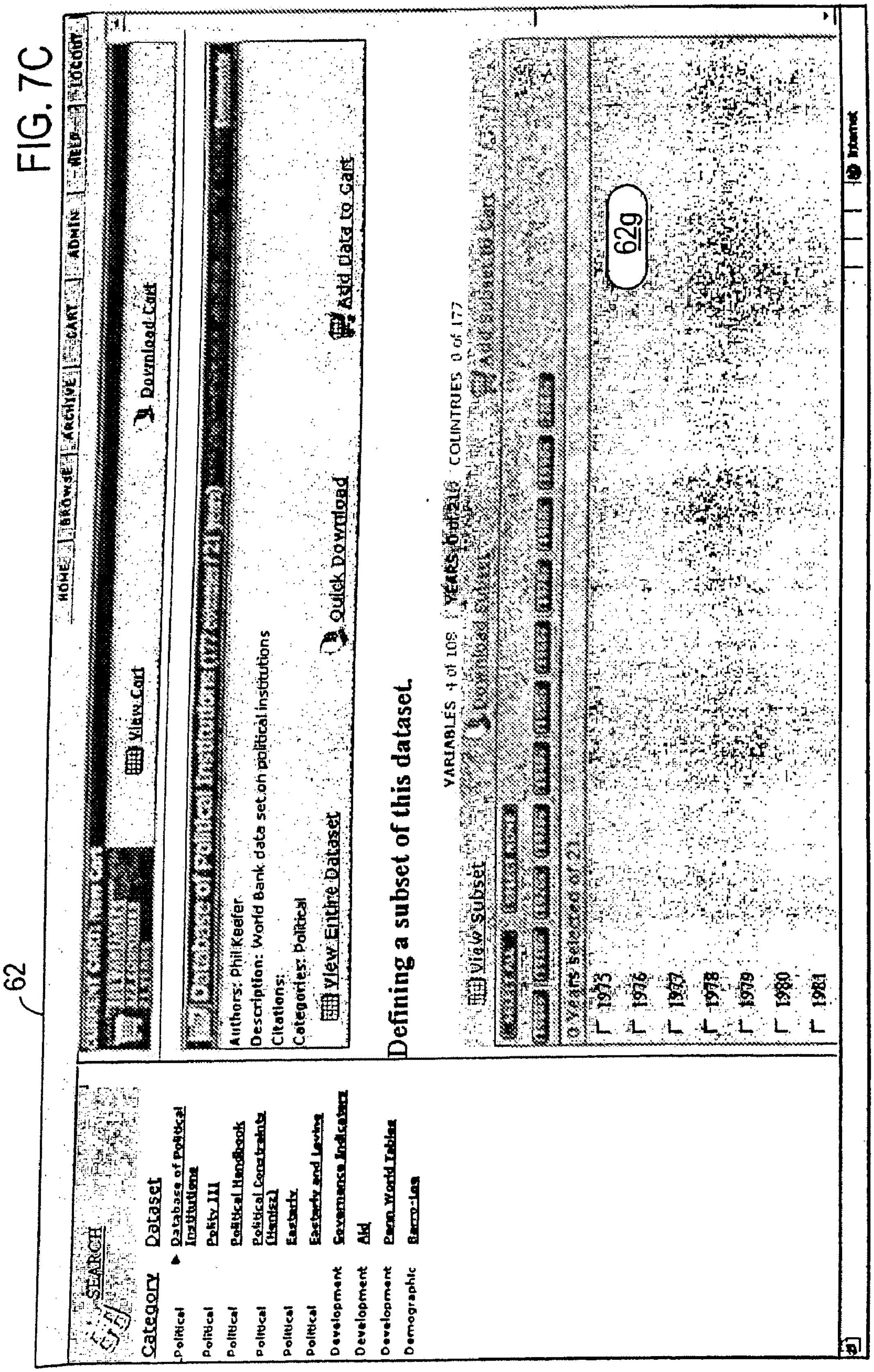
Figure 7D:
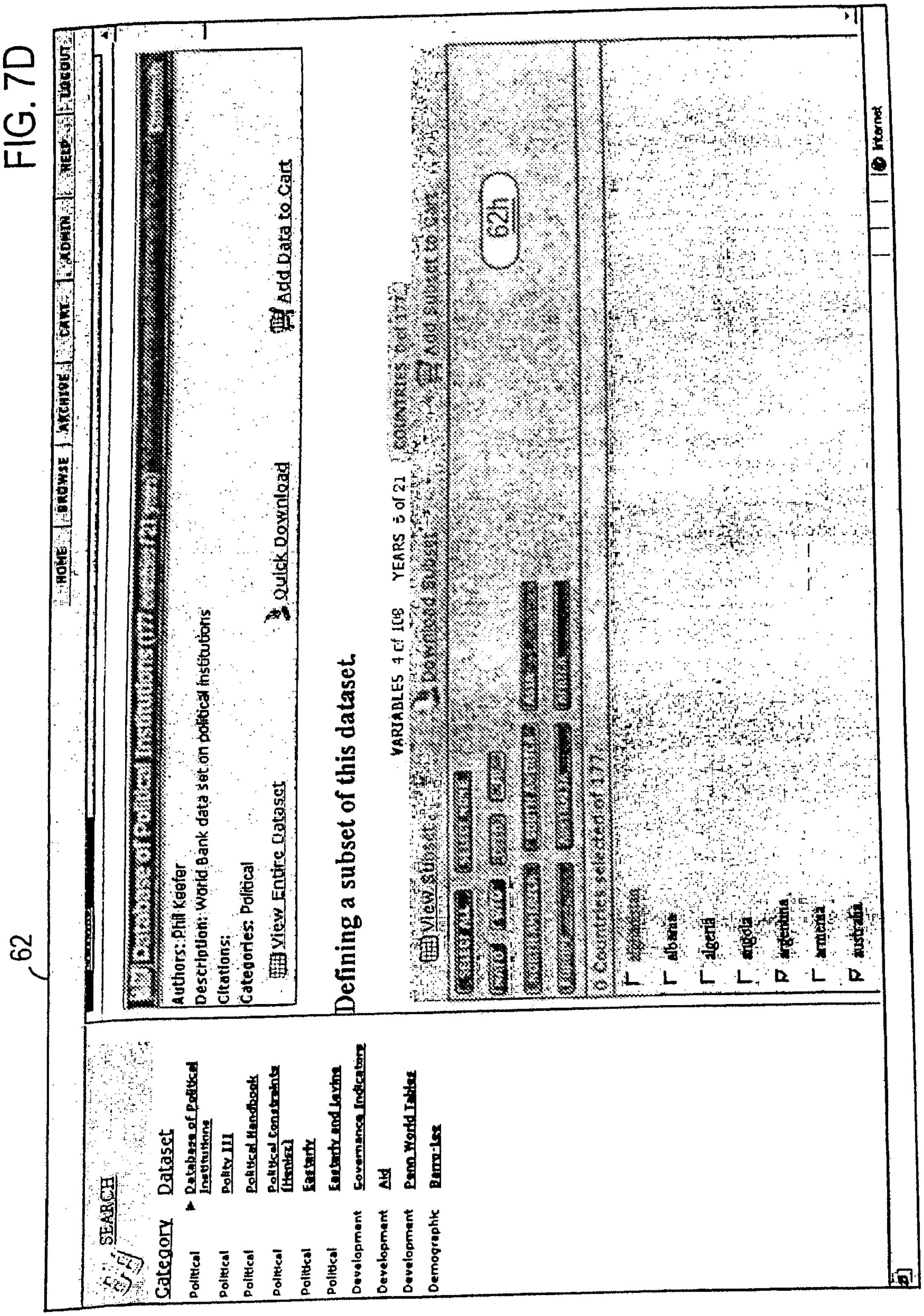

FIG. 7C shows main browsing section 62 with the years tab 62*g* selected. In the illustration, the user can select all years, select individual years one by one, or select years in groups decade by decade. Individual controls exist for each value the variable can adopt. Similarly, FIG. 7D shows the same view, but with the countries tab 62*h* selected. In the example, countries can be selected one at a time, or in groups by continent or international affiliations.

Data Cart

Figure 8A:
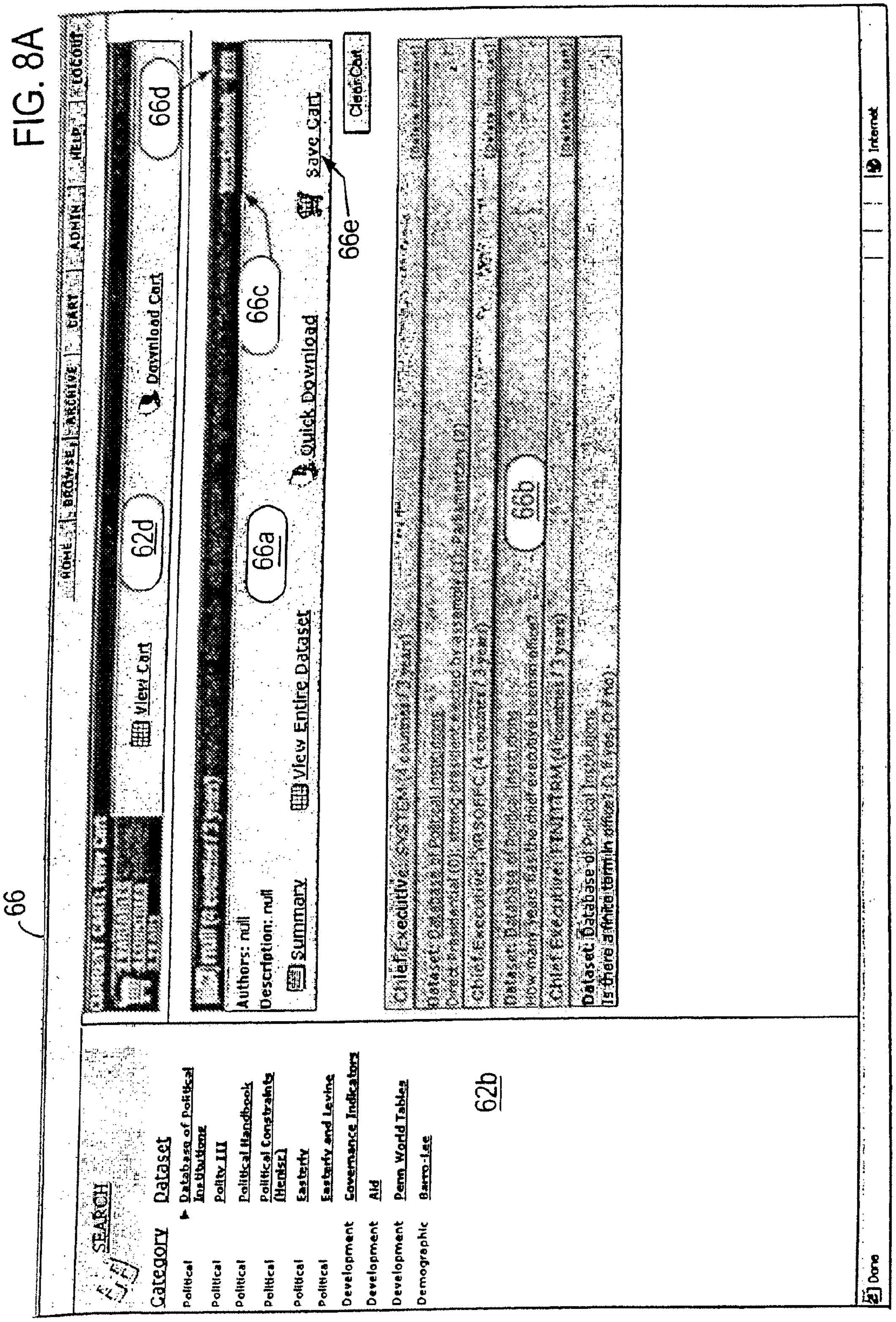
FIGS. 8A and 8B are snapshots of a user interface for a data cart.

Referring to FIG. 8A, an example data cart screen 66 results from the user's clicking on the Add Data to Cart button or the Add Subset to Cart button, shown in FIG. 7A. The cart summary area 66*a* displays summary information about the current cart, while the list of variables 66*b* contains a list of the variables currently included in the data cart 50 (FIG. 2), and any relevant metadata information. In data cart screen 66, the dataset listing 62*b* and data cart summary information 62*d* remain, as in browsing area 62. Additionally, data cart screen 66 allows a user to view and generate the codebook 66*c* associated with the data cart 50. Codebook 66*c* is a custom-generated list of the metadata associated with the variables in the current blockset. Referring to FIG. 9, a sample codebook window 68 includes the metadata 68*a* for a sample variable.

Thus the process of selecting data in system 10 allows users to place variables in their data cart 50, just as online shopping providers use a shopping cart for goods and services. The process of selecting data for data cart 50 is analogous: users place variables in their data cart. The cart analogy makes system navigation easy and intuitive; the users need only select the variables that they want and put them into a cart. They can combine variables from more than one dataset as long as all datasets belong to the same data group. When all desired variables have been added, the user can "check out"

the cart by downloading the data, as described below. This construction also allows for asynchronous data selection; users can build their custom-made data sets a little at a time, as opposed to systems in which the variable selection must be made all at once. Data carts can be created and modified quickly due to their underlying blockset construction, whereby variables can be added and subtracted from blocksets via the manipulation of their metadata only, allowing the browsing process to occur without noticeable system delays.

As the user browses the website, she can use web forms to define data Blocks by choosing a dataset and specifying year and country subsets. The most recent block definition is stored with the user's session information. This block is used when new datasets are browsed; their most recent year and country selections are pre-filled into the forms associated to each dataset viewed.

If, while using a dataset Block definition form, a user chooses the "Add to Cart" feature, the currently defined Block is added to the list of blocks making up the current data cart blockset for that user. At any time, a user can view a web page which shows a list of the blocks contained in their current Datacart. This page is generated by iterating through the distinct Blocks in the Block list which defines the users datacart object. From this page, the user can choose to "Remove" individual Blocks from their cart. When the remove operation is requested, the system shortens the list of blocks in the user's datacart by one item, and the specified block is no longer referenced by the datacart object.

A user session can continue, with the user defining, adding, and removing Blocks from their dataset multiple times. If and when they decide they want to "Save" this cart, the system prompts for information about the cart. In particular, referring to FIG. 1C, the user provides a title 48, a description 48*c*, and a public flag 48*f* for the cart. The entered title and description are combined with the privacy flag, the user's ID 44*a*, the current date, and a unique ID (blockset key 48*a*). This information is saved into application database 20. A description of each Block in the datacart's list of Blocks is saved as a separate row in block table 46. Rows in this table contain a blockset FK 46*c* column which references back to this cart's ID. In this way, blocks for a specified cart are uniquely identified.

Data Cart Information

Referring again to FIG. 8A, the user has the option of editing her data cart either by using the edit button 66*d* or the Save Cart feature 66*e*. Each of these leads to a data cart editing screen 70, shown in FIG. 10. The data cart information form 70*a* can contain any of a number of fields relating to the summary cart information. The cart may also be saved as public or private. If the former, then any other registered user may view that data cart; if private, then only the user herself may view the cart in the Archive, described below. These choices need not be dichotomous; intermediate levels of access can be specified as well, depending on the particular organization's needs. For instance, only registered users with a certain clearance level or above may have access to certain data and saved carts.

Figure 7E:
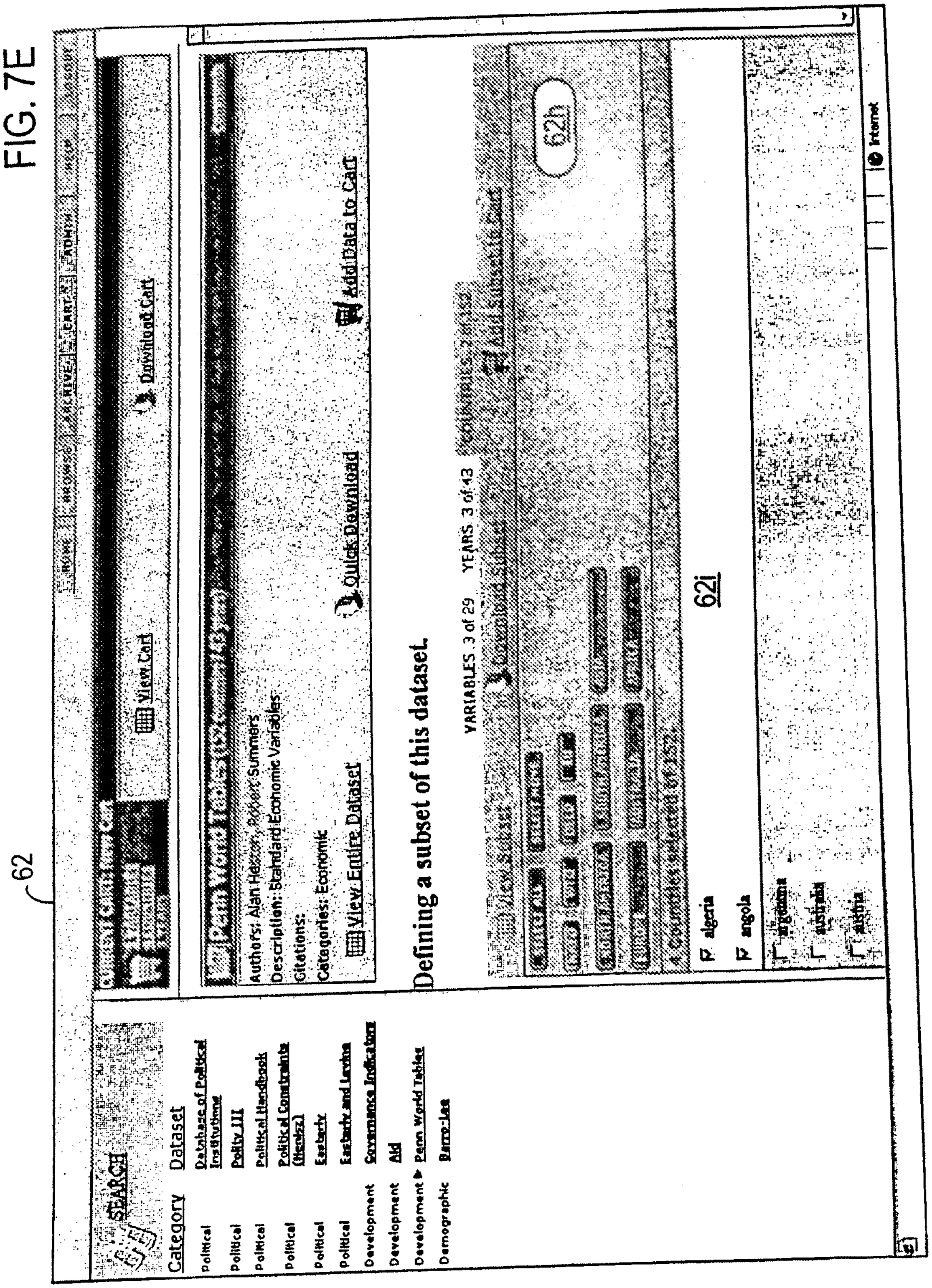

After variables have been added to the data cart, the user can return to browsing the data sets, as illustrated in FIG. 7E. Any other dataset can be selected, and its variables can be added to the variables currently in the data cart. In the illustrated embodiment, the system displays the choices on the blocking variables made on the previous blockset added to the cart. In the illustration, the previous countries and years are both automatically selected and highlighted, the countries tab being shown as 62*h*, with highlighted previous choices as 72*i*.

Figure 8B:
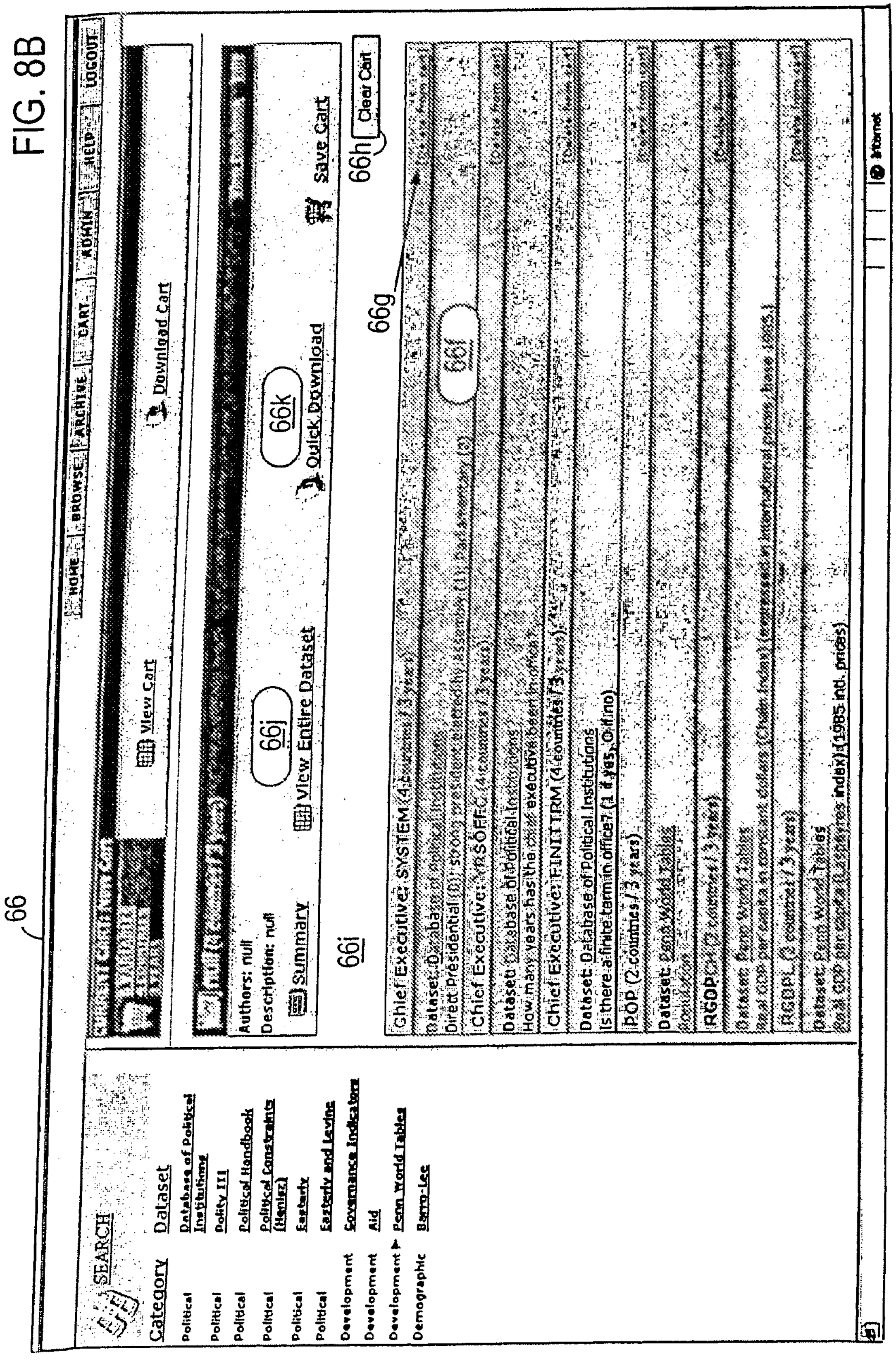
Figure 10:
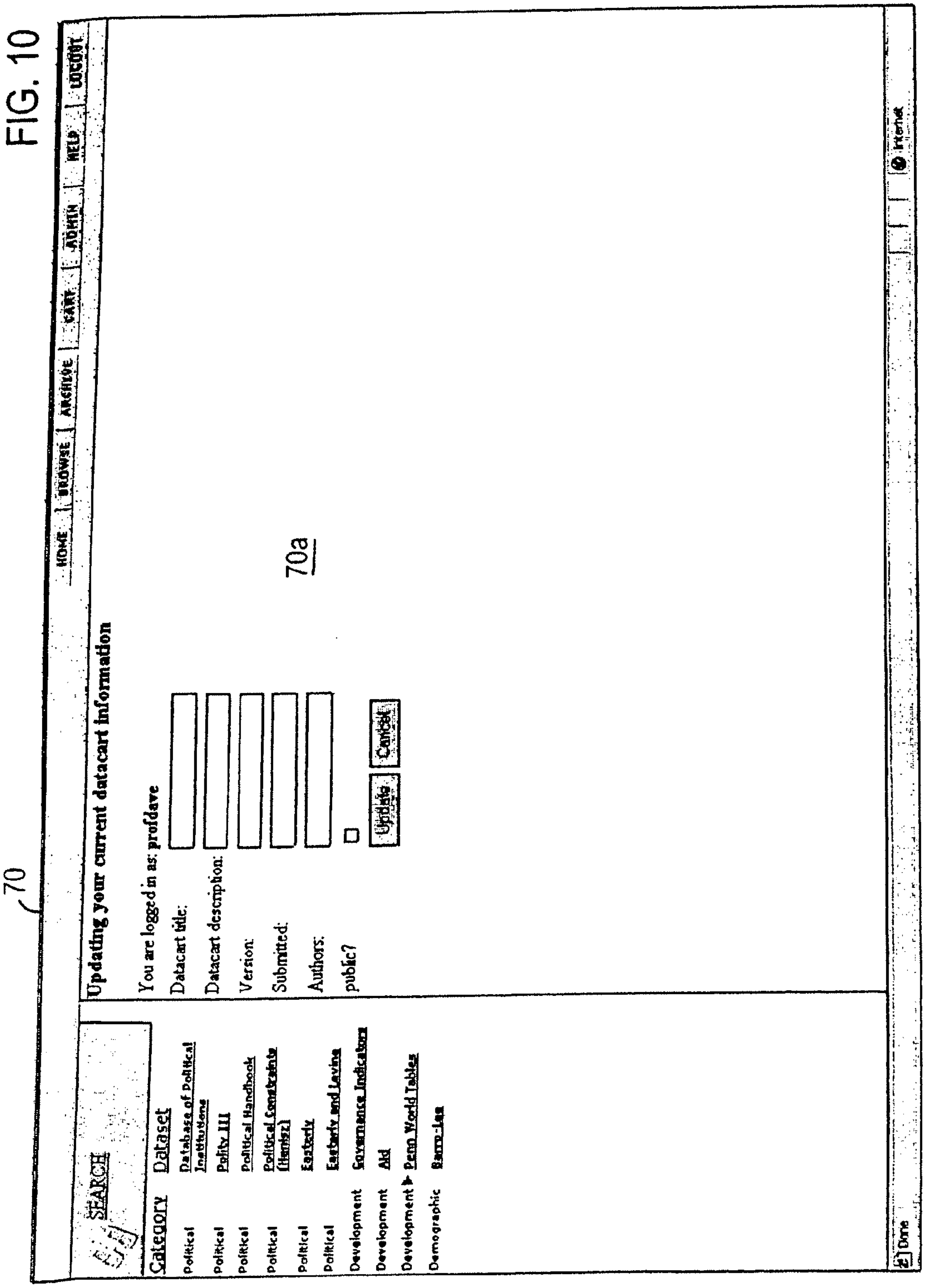
FIG. 10 is a snapshot of a user interface for a data cart information entry page.

Referring to FIG. 8B, if the user adds more variables to their data cart, then the list of variables in the cart display 66*f* is expanded to include the variables from all data sets added to the cart. Items can be removed from the cart either one at a time via 66*g*, or in their entirety via 66*h*. Summary information from the cart is available via 66*i*. As above, the entire blockset can be viewed with control 66*j* or "checked out"—downloaded—with control 66*k*.

Archive

Figure 11A:
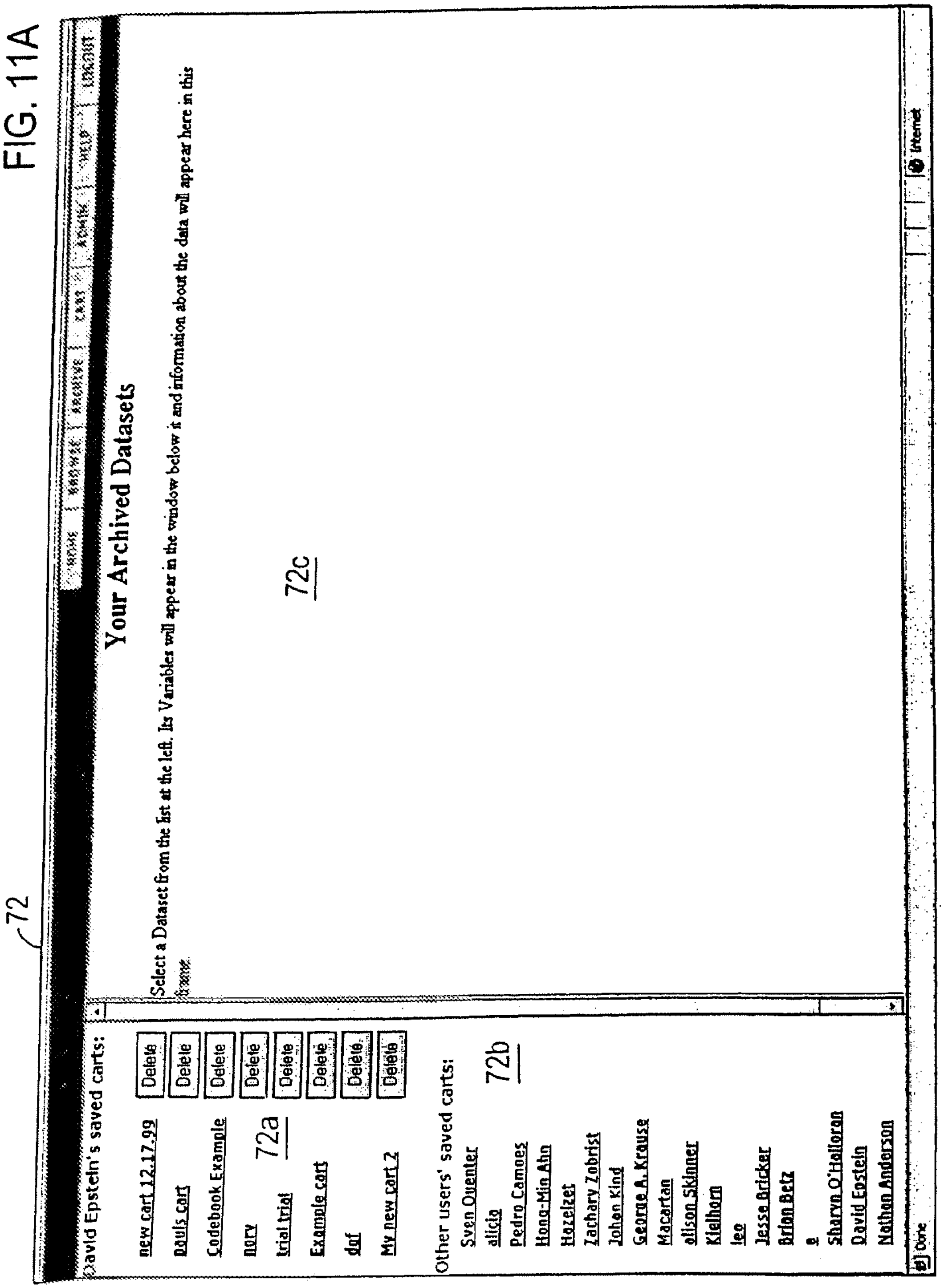
FIGS. 11A and 11B are snapshots of a user interface for a dataset archive.
Figure 11B:
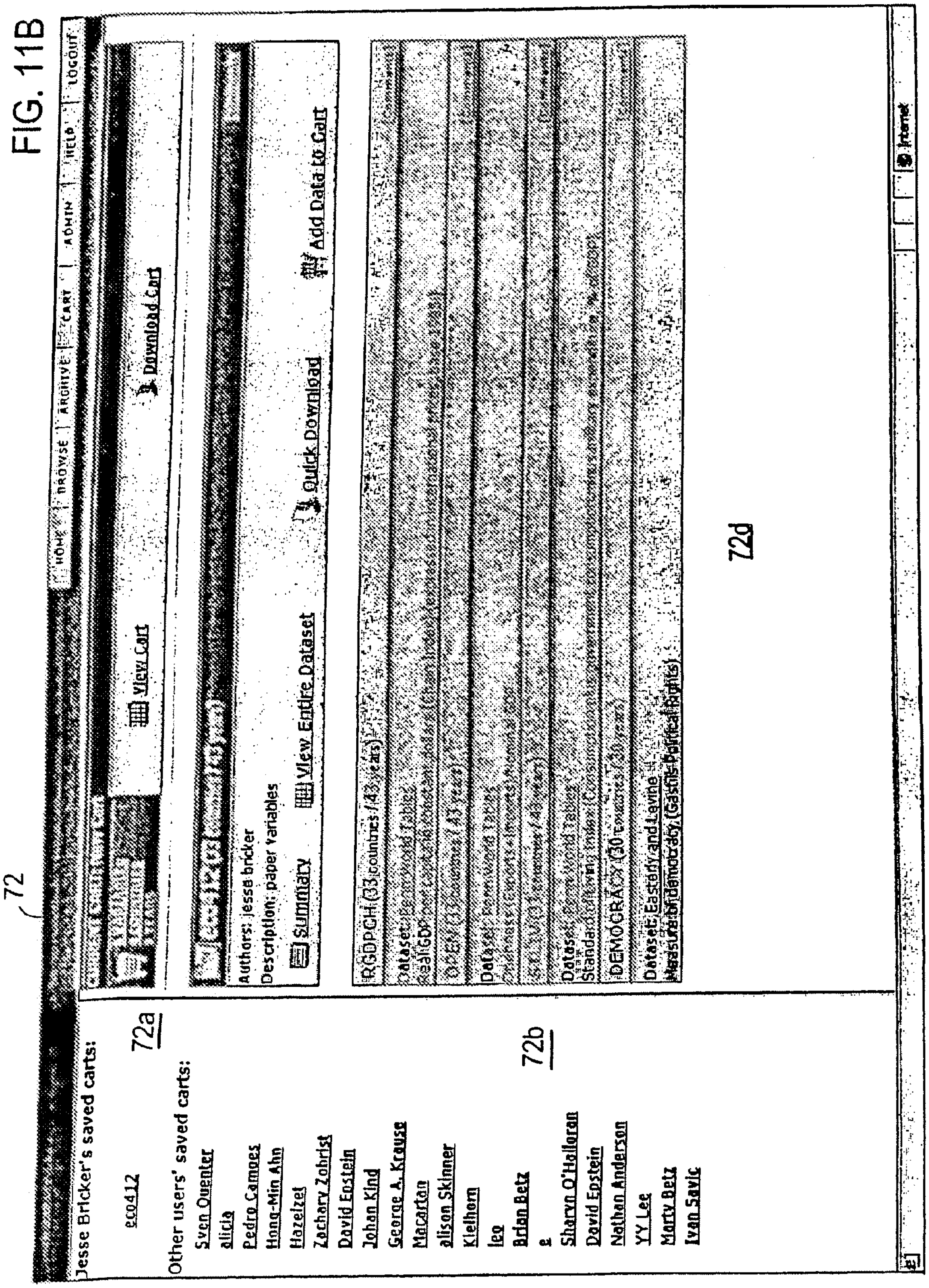

Referring now to FIGS. 11A and 11B, the user accesses archive section 72 through the standard toolbar 60*d*. One area of archive section 72 shows saved carts 72*a*, as well as carts 72*b* from other users who have placed public carts on the system. The user can delete her own carts. When another user's name is selected, then their publicly saved carts appear. Clicking on any saved cart brings that cart's information into the viewing area 72*c*, as illustrated in FIG. 11B. This shows the variables in the saved cart 72*d*, which can then be manipulated as any other blockset.

The archive section 72 allows for collaboration by geographically dispersed users. Datasets can be saved, edited, and then saved again online, by manipulating the metadata of the saved blocksets. This makes dataset storage inexpensive from the viewpoint of system resources, and it makes the saving and retrieval of data carts quick and efficient. As with the data cart, the archive area also allows the user to select variables asynchronously. Not only can data be added to a cart a little at a time over a single login session, but saved carts add the possibility of stretching the dataset creation process across multiple sessions without having to rebuild the dataset from scratch every time.

Dataset Upload

Figure 12A:
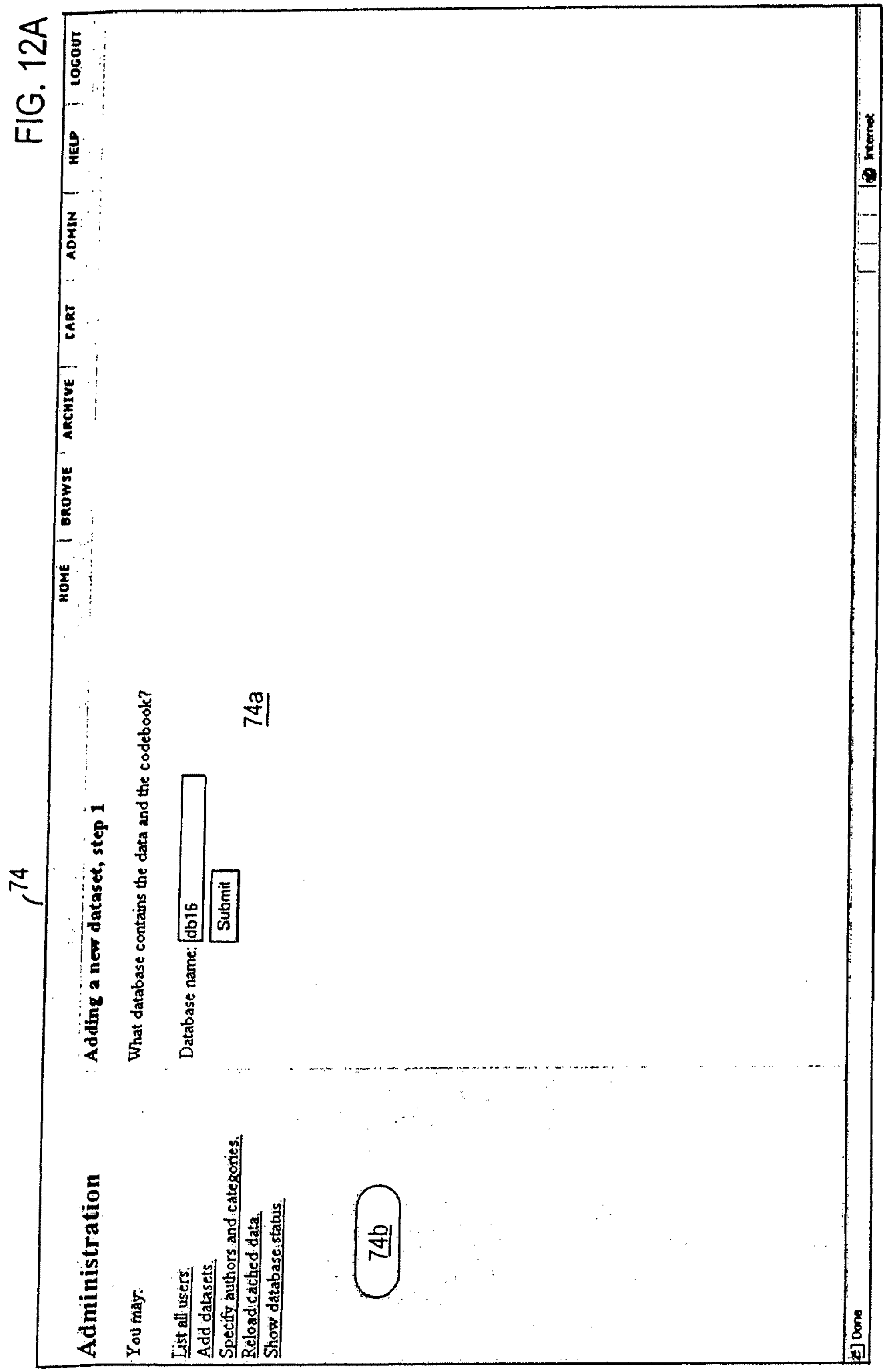
Figure 12B:
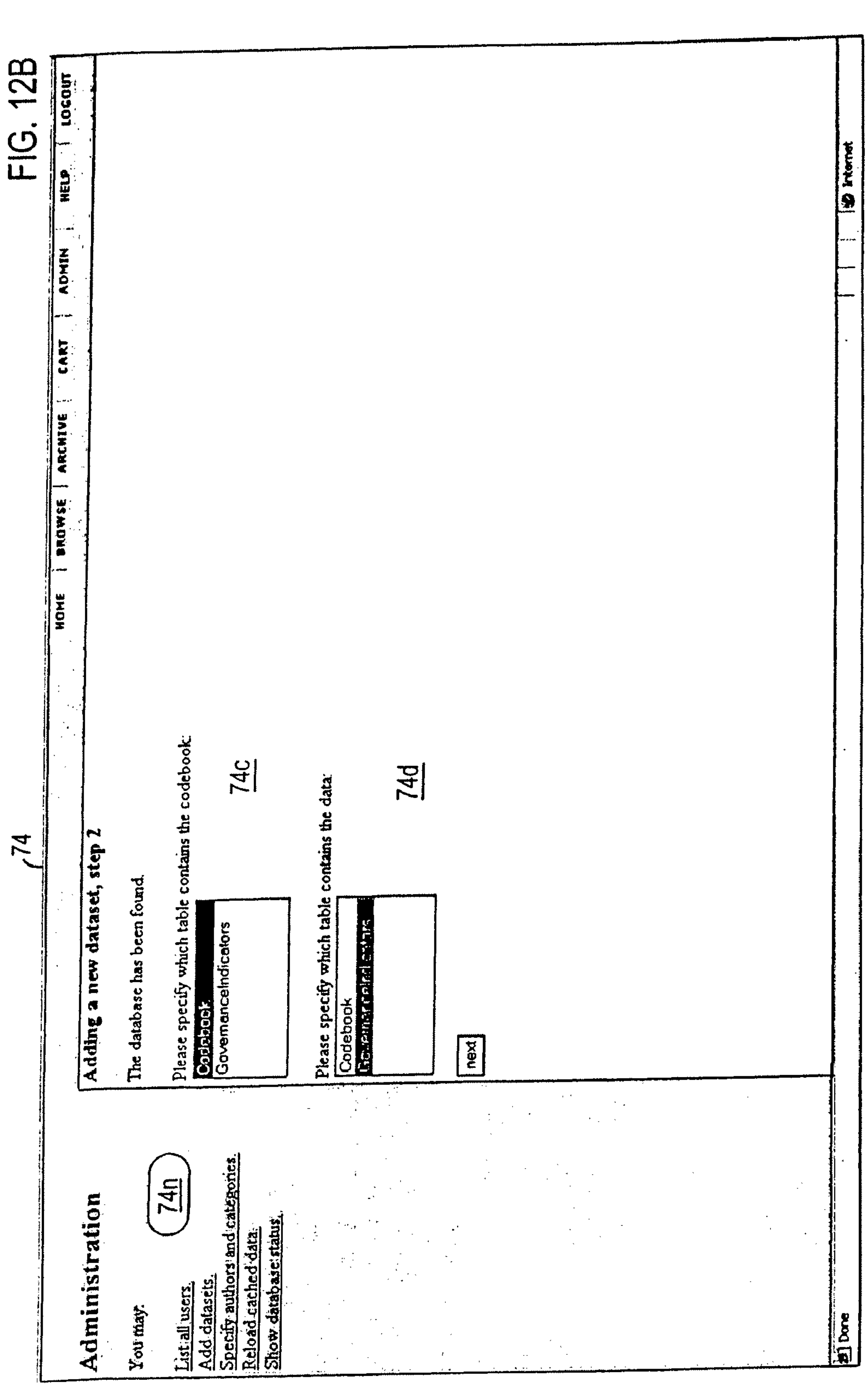
Figure 12D:
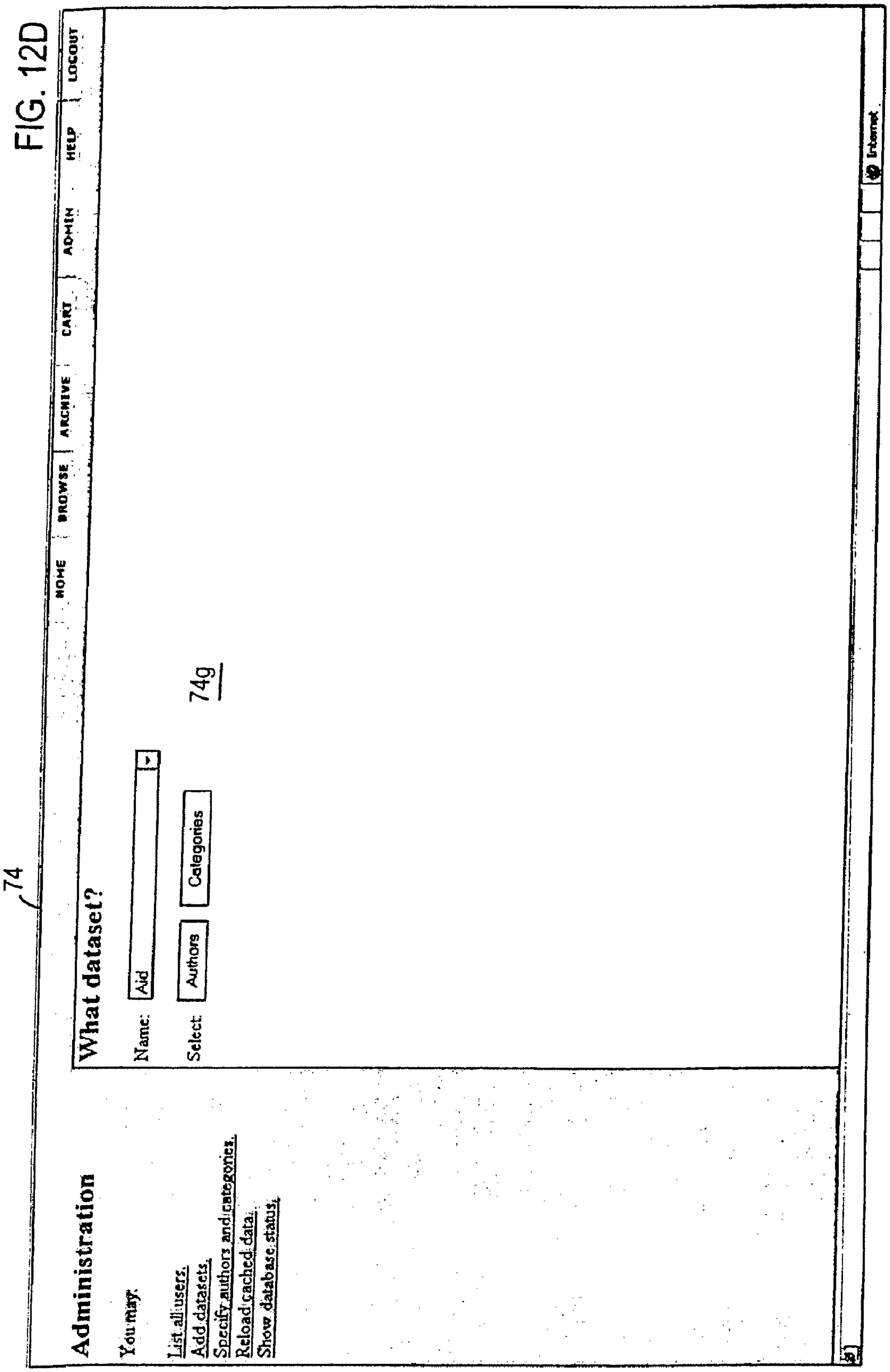
Figure 12G:
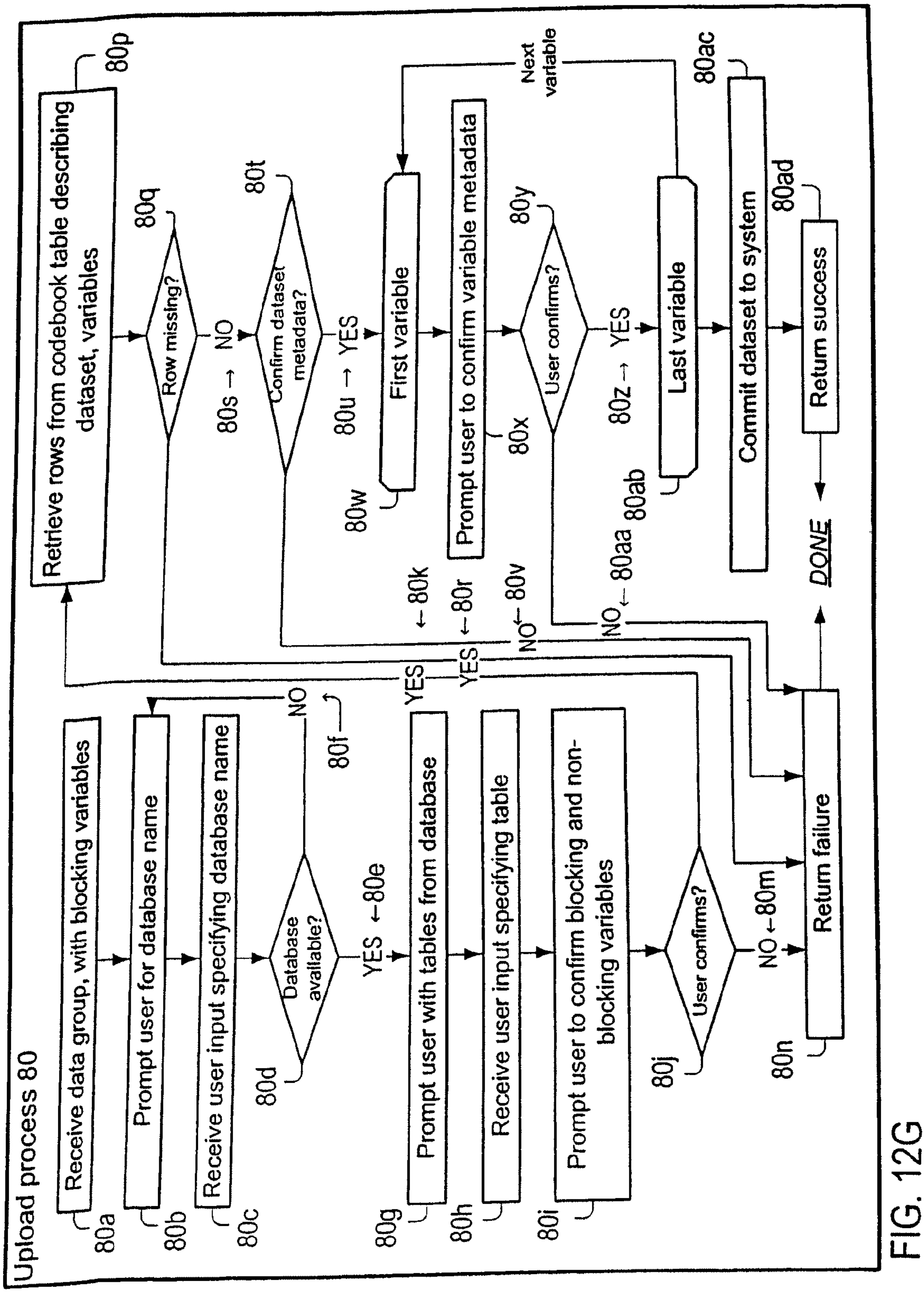
FIG. 12G is a flowchart for an upload process.
Figure 12H:
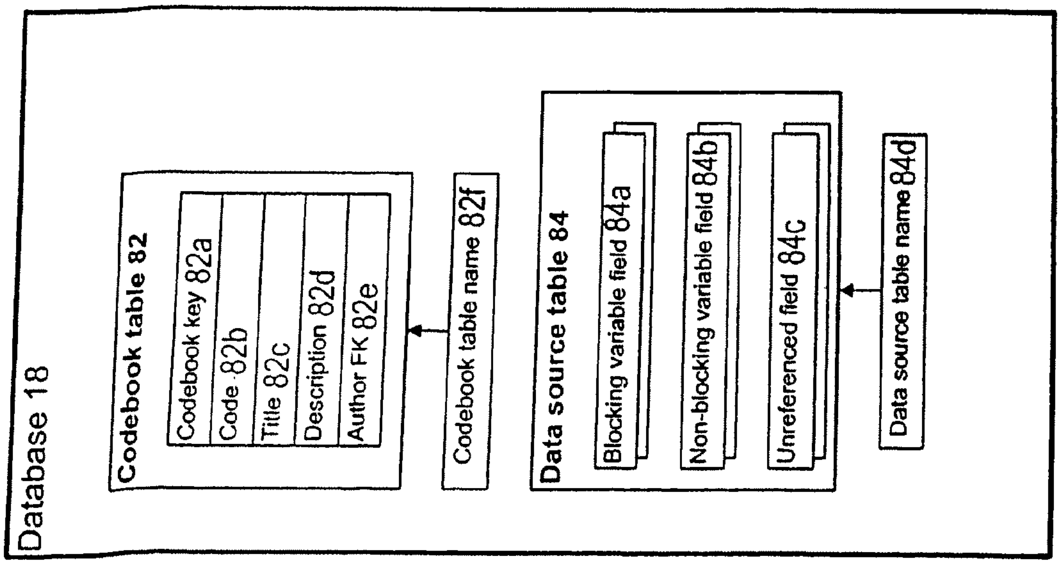
FIG. 12H is a diagram of a database schema for a codebook table.

Referring to FIG. 12A and FIG. 12H, an administrator screen 74 is accessible to users with administrative privileges. The left-hand pane 74*b* in FIG. 12A lists administrative options, including List All Users, and Add datasets 74*n*. When the user selects the control 74*n* to add a dataset, the system initiates a wizard interface as illustrated in the right-hand pane 74*a*. In the example, the databases to be loaded into the system are first located within a single directory on the server; hence only the database name need be entered. In alternative embodiments, a fully qualified directory path or URL could be entered, requiring only that the server have access privileges to the specified location. The database name is a value to be stored in database name field 36*d* of dataset table 36 (FIG. 1C).

Upon entering this information, the user is taken to the screen 74 illustrated in FIG. 12B, where the user selects metadata codebook 74*c* and dataset 74*d*. Dataset 74*d* is a control that specifies a data source table 84 (FIG. 12H) of data that will be the basis for a dataset 24. The table is identified within its database by a data source table name 84*d*. Codebook 74*c* is a control that allows the user to specify a codebook table 82, which system 10 uses as a source of metadata to describe the dataset 24 to upload. Codebook table 82 is identified within its database by codebook table name 82*f*. If the dataset uploads successfully, system 10 stores this value in the field codebook name 36*g* of the corresponding row in dataset table 36 (FIG. 12H).

In general, a codebook table 82 stores information used to identify a dataset 24, such as the dataset name, the set of blocking variables, and the names of the non-blocking variables. Other useful metadata can be added as well, such as author, variable descriptions, and coding rules.

Each row of the codebook table 82 represents information applicable either to an entire dataset or to a variable within a dataset. When a row includes the keyword "dataset" in code field 82, the row represents a dataset 24. Otherwise, the row represents a variable—in particular, code field 82 gives the name of a non-blocking variable field 84*b* in data source table 84. Title 82*c* stores a name for the corresponding variable. Description 82*d* stores phrases describing dataset 24 in detail. Author FK 82*e* is a foreign key referencing author table 40, which allows a dataset or variable to be associated with a particular author.

Referring to FIG. 12C and FIG. 1C, after entering the dataset and codebook locators, the user is taken to screen 74, which lists the non-blocking variable names 74*e* as well as the actual values of the blocking variables 74*f*. Upon user confirmation, the data can be added to the system. Each non-blocking variable has a corresponding row in codebook table 82, which serves as the basis for a new corresponding row in variable table 38. In particular, title 82*c* maps to title 38*c*, description 82*d* to description 38*e*, and code 82*b* to name 38*g*.

The row in codebook table 82 with "dataset" in code field 82*b* corresponds to a new row in dataset table 36. In this case, description 82*d* maps to description 36*f*.

Other administrative features can be added to the system as well, including facilities for maintaining user accounts, assigning privileges, and editing metadata. An illustration of the latter is provided in FIG. 12D, where the administrator is presented with a form 74*g* through which she can modify a dataset's author and category information. The author editing screen is illustrated in FIG. 12E, which displays the current author information 74*h*, the list of potential authors currently in the system 74*i*, and a form 74*j* for adding a new author. Similarly, FIG. 12F offers the possibility of adding or amending category information. The current set of categories is provided in 74*k*, possible additional categories already in the system are provided in 74*m*, while new categories can be added via 74*p*.

Referring to FIG. 12G, an upload process 80 guides a user through a process of adding a dataset 24 to the system, verifying that the necessary metadata is in place. Upload process 80 receives a data group 34, either explicitly as a passed value or reference, or implicitly by a default value (step 80*a*). The data group 34 has a set of blocking variables.

Upload process 80 presents a user interface that prompts a user for a database name (step 80*b*). Upload process 80 then receives user input specifying database name, which upload process 80 stores (step 80*c*). Upload process 80 compares the database name to its current set of databases 18 (FIG. 1A) and determines whether the database name specifies a database 18 that system 10 can connect to, for example using an ODBC connection (step 80*d*). If so (result 80*e*), upload process 80 connects to the database and retrieves a list of tables in the database to present to the user (step 80*g*). Otherwise, if the database is not available (result 80*f*), the process prompts again for database name (step 80*b*).

The user can choose a data source table 84 from the list of tables, as well as a codebook table 82 (FIG. 12H). Upon receiving input specifying the user's choice (80*h*), upload process 80 prompts the user to confirm blocking and non-blocking variables in the data source table (step 80*i*). Upload process 80 tests whether the user input confirms that the blocking and non-blocking variables are identified correctly (step 80*j*). With confirmation (result 80*k*), upload process 80 retrieves rows from codebook table 82 that describe the dataset and variables (step 80*p*). If the user does not provide confirmation (result 80*m*), upload process 80 returns failure (step 80*n*) and terminates without adding a dataset 24 to the system.

Upload process 80 verifies that the rows in codebook table 82 correspond to the dataset and variables of data source table 84 (step 80*q*). If any row is missing (result 80*r*), upload process 80 returns failure (step 80*n*) and terminates without adding a dataset 24 to the system. Otherwise (result 80*s*), upload process 80 prompts the user and receives input to confirm the metadata for the prospective dataset 24 itself, as opposed to the metadata for the variables (step 80*t*). Such metadata for the dataset includes its storage name, its name in presentation to users (i.e., a caption), a textual description, and its location.

If the dataset metadata is confirmed (result 80*u*), upload process 80 loops to confirm each of the variables (loop bounded by 80*w* and 80*ab*). Otherwise, if the dataset metadata is not confirmed (result 80*v*), the process returns failure (step 80*n*) and terminates without adding a dataset 24 to the system.

Upload process 80 iterates over each variable to prompt the user with the associated metadata (step 80*x*), for example the storage name, the title, a textual description, associated keywords, and units. Upload process 80 tests the user's response (step 80*y*). If the user rejects any variable's metadata (result 80*aa*), the process returns failure (step 80*n*) and terminates without adding a dataset 24 to the system. Otherwise (result 80*z*), upload process 80 commits the dataset 24 to application database 20 and adds a corresponding database 18 as the provider of the underlying data.

Codebook Download

When a user asks to download the codebook information about a specified dataset or saved datacart, the system iterates through each block of the datacart. For each block, it retrieves all codebook records which reference either the dataset containing that block, or a variable within that block's definition. This codebook information is stored in memory and formatted for display in a web page, or for printing. When a secondary table row is referenced, e.g. when an author is specified, the author table is queried, the information is retrieved and then formatted.

Figure 13:
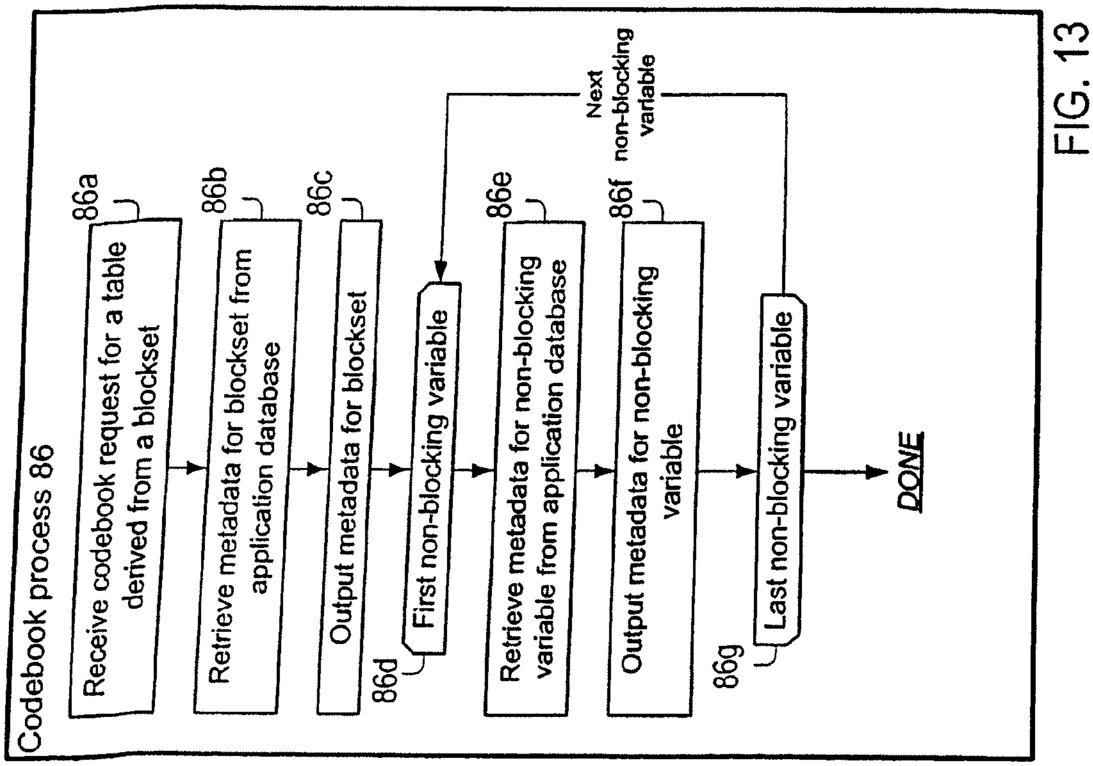
FIG. 13 is a flowchart of a codebook process.

Referring to FIG. 13 and FIG. 1C, a codebook process 86 receives a request for a codebook for a table derived from a blockset (step 86*a*). Codebook process 86 retrieves metadata for blockset from application database 20, for example title 48*e* and description 48*c* from blockset table 48 (step 86*b*). Codebook process 86 outputs the metadata for blockset (step 86*c*), then loops over the variables of the derived table (loop bounded by 86*d* and 86*g*), as encoded in the rows in variable table 38. For each such variable, codebook process 86 retrieves metadata from the application database (step 86*e*). Such metadata includes a variable title 38*c*, a description 38*e*, and the title 36*b* of the associated dataset in dataset table 36.

ALTERNATIVE EMBODIMENTS

A number of embodiments of the invention have been described. Nevertheless, it will be understood that various modifications may be made without departing from the spirit and scope of the invention. For example, databases 18 can be located on other machines than server 12, and can be connected via a database server. Thus the server 12 can include multiple physical machines distributed across a network.

In the described embodiment, each block 26 has one blockset 28. This provides an administrative advantage, in that edits to the block of a first blockset 28 cannot affect other blocksets, since blocks are not shared. In alternative embodiments, however, blocks could be shared by blocksets.

In the described embodiment, codebook table 82 includes basic text information like descriptions and comments. In alternative embodiments, codebook table 82 could also reference rows in other tables of application database 20, such as citation records or categories.

Accordingly, other embodiments are within the scope of the following claims.

What is claimed is:

1. A computer-based method of defining a set of data to be accessed, the method comprising:

presenting a graphical user interface with controls for selecting variables, wherein the selected variables are selected from data sets;

providing, in the graphical user interface, controls for selecting values defining particular instances of the selected variables;

detecting a user interaction with the controls for selecting variables, wherein the user interaction comprises selecting variables and values;

in response to a second user interaction, generating a blockset, wherein the blockset comprises metadata representing instructions for combining the selected variables and values assigned to the selected variables; and in response to a third user interaction, interpreting the metadata to form a selected data set and providing the selected data set to a user.

2. The method of claim 1, wherein forming the selected data set comprises:

generating a block information structure specifying the data to be selected, and adding the block information structure to the blockset.

3. The method of claim 2, wherein generating the block information structure includes incorporating into the block information structure a representation of the selected variables and values.

4. The method of claim 3, further comprising:

for a particular variable included in the selected variables, presenting enumeration controls in the graphical user interface, each enumeration control corresponding to a set of values.

5. The method of claim 1, in which: the user interaction comprises specifying a subset of a dataset.

6. The method of claim 1, wherein forming the selected data set comprises:

saving the selected variables and values to a persistent storage medium.

7. The method of claim 1, wherein the set of data to be accessed comprises a plurality of rows.

8. The method of claim 7, further comprising adding a row to the set of data to be accessed.

9. The method of claim 1, wherein the graphical user interface comprises controls representing the set of data to be accessed.

10. The method of claim 1, wherein the graphical user interface comprises controls representing a superset of the set of data to be accessed.

11. The method of claim 1, further comprising adding a column to the set of data to be accessed.

12. The method of claim 1 in which the set of data to be accessed comprises a plurality of columns.

13. The computer-implemented method of claim 1 wherein the metadata comprises at least a database name, a blocking variable list and a non-blocking variable list.

14. A computer-readable medium having encoded thereon software for defining a set of data to be accessed, the software comprising instructions that when executed by one or more computers cause the one or more computers to perform operations comprising:

presenting a graphical user interface with controls for selecting variables, wherein the selected variables are selected from data sets;

providing, in the graphical user interface, controls for selecting values defining particular instances of the selected variables;

detecting a user interaction with the controls for selecting variables, wherein the user interaction comprises selecting variables and values;

in response to a second user interaction, generating a blockset, wherein the blockset comprises metadata representing instructions for combining the selected variables and values assigned to the selected variables; and in response to a third user interaction, interpreting the metadata to form a selected data set and providing the selected data set to a user.

* * * * *

UNITED STATES PATENT AND TRADEMARK OFFICE

CERTIFICATE OF CORRECTION

PATENT NO. : 8,171,050 B2
APPLICATION NO. : 12/169477
DATED : May 1, 2012
INVENTOR(S) : Sharyn O'Halloran, David Epstein and Martin Betz It is certified that error appears in the above-identified patent and that said Letters Patent is hereby corrected as shown below:

Title page, Item (73) Assignee: (Assignee's name) after "DataVine Research Services" insert --U.S.--.

Column 18, line 18 (Claim 13) delete "computer-implemented" and insert --computer-based--.

Signed and Sealed this
Thirty-first Day of July, 2012

David J. Kappos
*Director of the United States Patent and Trademark Office*